(12) United States Patent
Hoshina et al.

(10) Patent No.: US 10,199,648 B2
(45) Date of Patent: *Feb. 5, 2019

(54) ELECTRODE, NONAQUEOUS ELECTROLYTE BATTERY, BATTERY PACK AND VEHICLE

(71) Applicant: KABUSHIKI KAISHA TOSHIBA, Minato-ku (JP)

(72) Inventors: Keigo Hoshina, Kashiwazaki (JP); Yasuhiro Harada, Isehara (JP); Norio Takami, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 204 days.

This patent is subject to a terminal disclaimer.

(21) Appl. No.: 15/261,418

(22) Filed: Sep. 9, 2016

(65) Prior Publication Data

US 2017/0077508 A1 Mar. 16, 2017

(30) Foreign Application Priority Data

Sep. 16, 2015 (JP) .................................. 2015-182759

(51) Int. Cl.
*H01M 4/485* (2010.01)
*H01M 4/36* (2006.01)
(Continued)

(52) U.S. Cl.
CPC ......... *H01M 4/485* (2013.01); *H01M 2/1077* (2013.01); *H01M 4/131* (2013.01);
(Continued)

(58) Field of Classification Search
CPC ......... H01M 10/0525; H01M 10/0569; H01M 2/1077; H01M 4/364; H01M 4/485; H01M 4/131

See application file for complete search history.

(56) References Cited

U.S. PATENT DOCUMENTS

| 2009/0069740 A1* | 3/2009 | Visco ..................... A61K 33/24 604/20 |
| 2011/0121240 A1 | 5/2011 | Amine et al. |

(Continued)

FOREIGN PATENT DOCUMENTS

| JP | 2005-267940 A | 9/2005 |
| JP | 2009-181905 A | 8/2009 |

(Continued)

OTHER PUBLICATIONS

Extended European Search Report dated Oct. 24, 2016 in Patent Application No. 16187373.2.
(Continued)

*Primary Examiner* — Stewart A Fraser
*Assistant Examiner* — Rachel L Zhang
(74) *Attorney, Agent, or Firm* — Oblon, McClelland, Maier & Neustadt, L.L.P.

(57) ABSTRACT

According to one embodiment, there is provided an electrode. The electrode includes an orthorhombic Na-containing niobium titanium composite oxide as a first composite oxide and a second composite oxide represented by a general formula of $Li_{2+a}Na_{2+b}Ti_6O_{14}$, wherein $-0.2 \leq a \leq 2$ and $-0.2 \leq b \leq 0.2$.

13 Claims, 6 Drawing Sheets

(51) Int. Cl.
*H01M 10/0569* (2010.01)
*H01M 2/10* (2006.01)
*H01M 4/131* (2010.01)
*H01M 10/0525* (2010.01)
*H01M 4/02* (2006.01)

(52) U.S. Cl.
CPC ....... *H01M 4/364* (2013.01); *H01M 10/0525* (2013.01); *H01M 10/0569* (2013.01); *H01M 2004/021* (2013.01); *H01M 2004/027* (2013.01); *H01M 2220/20* (2013.01); *H01M 2300/0037* (2013.01); *Y02E 60/122* (2013.01)

(56) References Cited

U.S. PATENT DOCUMENTS

| | | | |
|---|---|---|---|
| 2011/0293507 A1 | 12/2011 | Dambournet et al. | |
| 2012/0328930 A1* | 12/2012 | Inagaki | H01M 4/485 429/163 |
| 2017/0077499 A1* | 3/2017 | Hoshina | H01M 4/364 |

FOREIGN PATENT DOCUMENTS

| | | |
|---|---|---|
| JP | 2014-103032 A | 6/2014 |
| WO | WO 2012/002365 A1 | 1/2012 |

OTHER PUBLICATIONS

Pengfei Wang, et al., "Improved lithium storage performance of lithium sodium titanate anode by titanium site substitution with aluminum," Journal of Power Sources, vol. 293, (2015), pp. 33-41.

Mengmeng Lao, et al., "Enhanced lithium storage property of Na-doped $Li_2Na_2Ti_6O_{14}$ anode materials for secondary lithium-ion batteries," RSC Advances: An International Journal to Further the Chemical Sciences, vol. 5, No. 52, May 5, 2015, pp. 41999-42008.

Pengfei Wang, et al., "Effect of Sodium-Site Doping on Enhancing the Lithium Storage Performance of Sodium Lithium Titanate," ACS Applied Material and Interfaces, vol. 8, No. 16, Apr. 7, 2016, pp. 10302-10314.

Izumi Nakai, et al., "Funmatsu X sen Kaisetsu no Jissai (Reality of Powder X-Ray Analysis)", X-Ray Analysis Investigation Conversazione, The Japan Society for Analytical Chemistry, Asakura Publishing Co., Ltd., 2002, pp. 97-115.

* cited by examiner

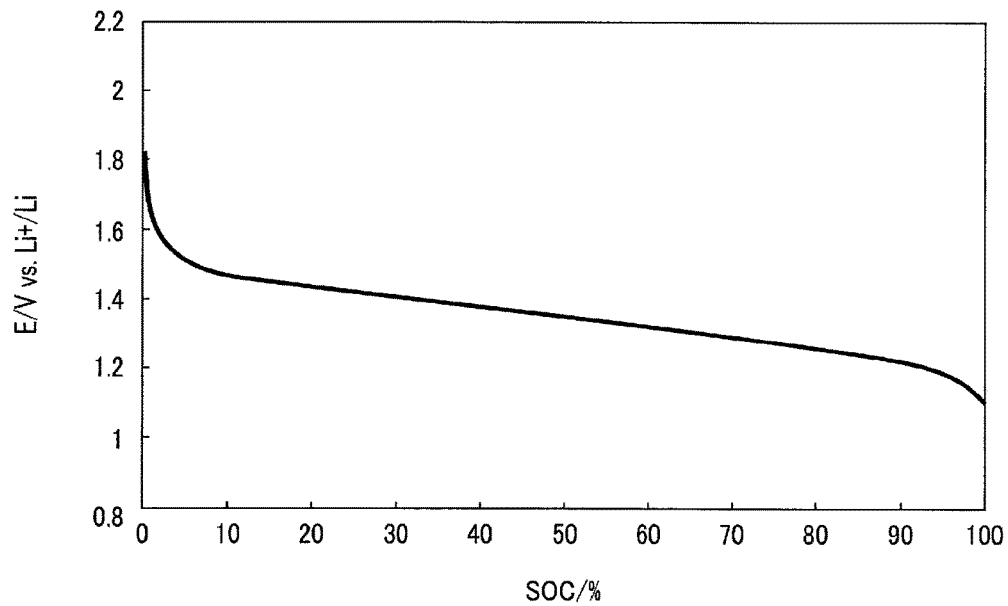
F I G. 1
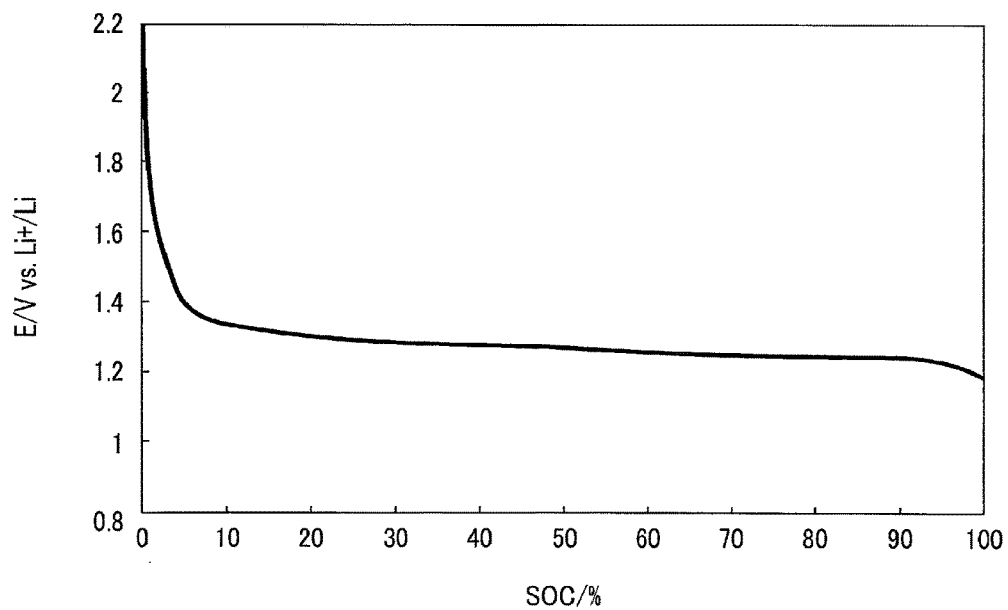
F I G. 2

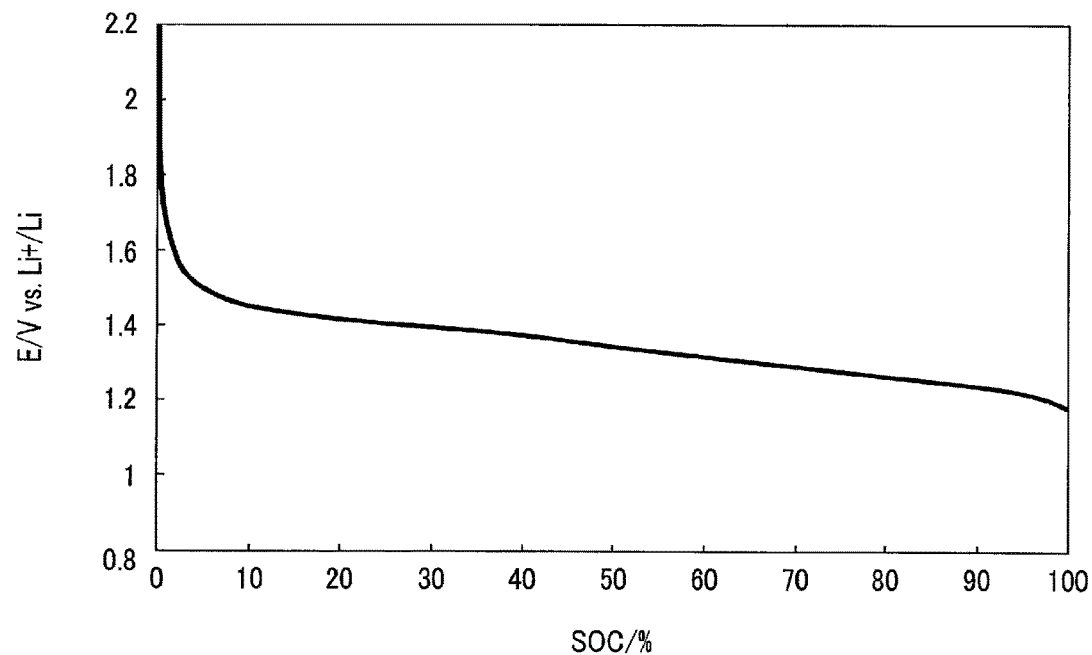
F I G. 3
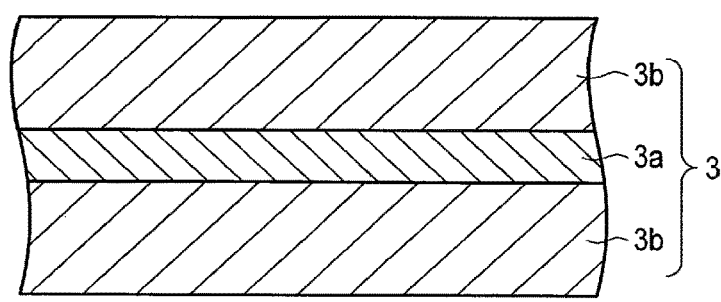
F I G. 4

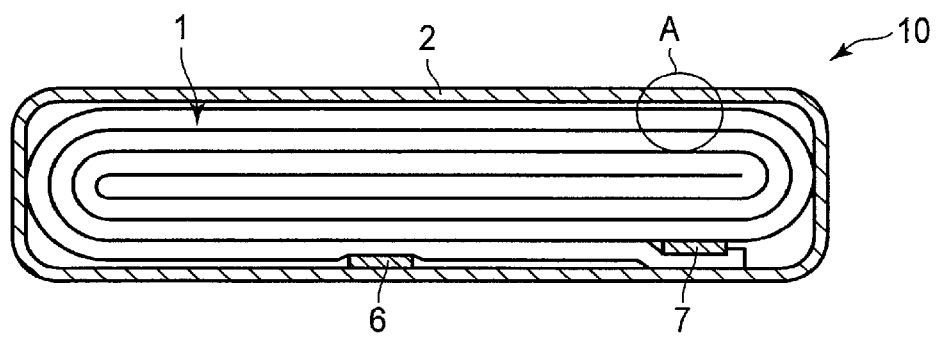
F I G. 5
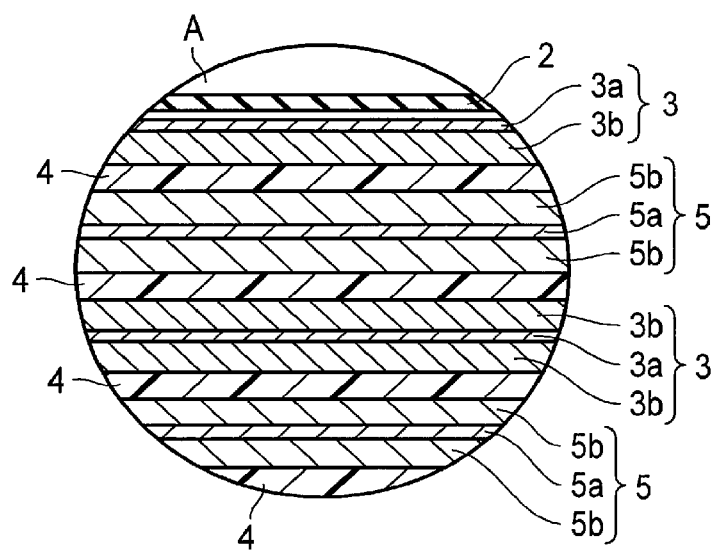
F I G. 6

US 10,199,648 B2

ELECTRODE, NONAQUEOUS ELECTROLYTE BATTERY, BATTERY PACK AND VEHICLE

CROSS-REFERENCE TO RELATED APPLICATIONS

This application is based upon and claims the benefit of priority from the Japanese Patent Application No. 2015-182759, filed Sep. 16, 2015, the entire contents of which are incorporated herein by reference.

FIELD

Embodiments described herein relate generally to an electrode, a nonaqueous electrolyte battery, a battery pack and a vehicle.

BACKGROUND

A nonaqueous electrolyte battery in which charge and discharge are performed by migration of lithium ions between a negative electrode and a positive electrode is actively researched as a high energy-density battery.

In addition to the use as a power supply for small electronic devices, the nonaqueous electrolyte battery is expected to be used as a medium to large power supply such as in-vehicle use or stationary use. For such a medium to large-scale use, the nonaqueous electrolyte battery is required to exhibit a life performance and a high-level safety. Further, the nonaqueous electrolyte battery is desired to exhibit high input-and-output performances.

A known example of a nonaqueous electrolyte battery exhibit a life performance and a high-level safety includes a nonaqueous electrolyte battery in which a spinel-type lithium titanate is used for a negative electrode. However, since the Li-insertion-and-extraction potential of the spinel-type lithium titanate is high (1.55 V (vs. Li/Li+)), a nonaqueous electrolyte battery in which the spinel lithium titanate is used for the negative electrode has a low battery voltage. Further, the spinel-type lithium titanate exhibits a flat charge-discharge curve in the lithium insertion-and-extraction potential range and shows a very small change in potential accompanying a change in state-of-charge.

BRIEF DESCRIPTION OF THE DRAWINGS

FIG. 1 is a charge curve of an orthorhombic Na-containing niobium titanium composite oxide of $Li_2Na_{1.7}Ti_{5.7}Nb_{0.3}O_{14}$;

FIG. 2 is a charge curve of a composite oxide of $Li_2Na_2Ti_6O_{14}$;

FIG. 3 shows a charge curve of an example of an electrode according to a first embodiment;

FIG. 4 is a schematic cross-sectional view of an example of the electrode according to the first embodiment;

FIG. 5 is a cross-sectional view showing a nonaqueous electrolyte battery, which is one example according to a second embodiment;

FIG. 6 is an enlarged cross-sectional view showing a portion A in FIG. 5;

DETAILED DESCRIPTION

Figure 7:
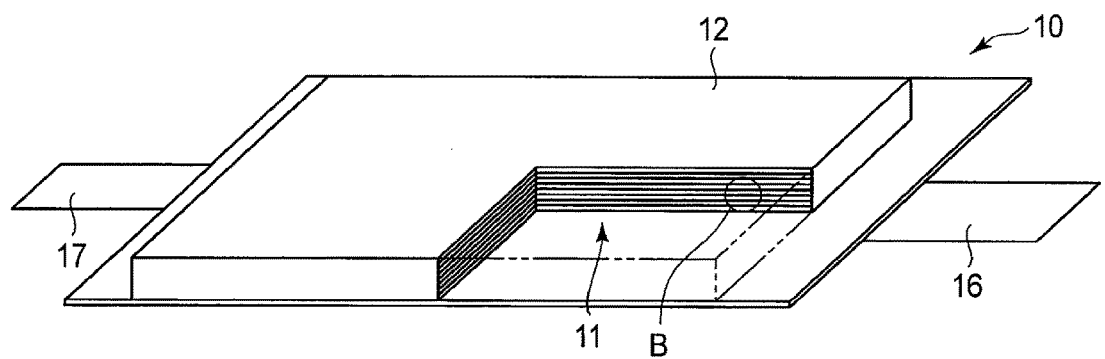
FIG. 7 is a partially cutaway perspective view schematically showing another nonaqueous electrolyte battery according to the second embodiment.

In general, according to one embodiment, there is provided an electrode. The electrode includes an orthorhombic Na-containing niobium titanium composite oxide as a first composite oxide and a second composite oxide represented by a general formula of $Li_{2+a}Na_{2+b}Ti_6O_{14}$, wherein $-0.2 \leq a \leq 2$ and $-0.2 \leq b \leq 0.2$.

According to the embodiment, there is provided a nonaqueous electrrolyte battery. The nonaqueous electrolyte battery includes the electrode according to the embodiment as a negative electrode, a positive electrode, and a nonaqueous electrolyte.

According to the embodiment, there is provided a battery pack. The battery pack includes the nonaqueous electrolyte battery according to the embodiment.

According to the embodiment, there is provided a vehicle. The vehicle includes the battery pack according to the embodiment.

The embodiments will be explained below with reference to the drawings. In this case, the structures common to all embodiments are represented by the same symbols and duplicated explanations will be omitted. Also, each drawing is a typical view for explaining the embodiments and for promoting an understanding of the embodiments. Though there are parts different from an actual device in shape, dimension and ratio, these structural designs may be properly changed taking the following explanations and known technologies into consideration.

(First Embodiment)

According to a first embodiment, there is provided an electrode. The electrode includes an orthorhombic Na-containing niobium titanium composite oxide as a first composite oxide and a second composite oxide represented by a general formula of $Li_{2+a}Na_{2+b}Ti_6O_{14}$, wherein $-0.2 \leq a \leq 2$ and $-0.2 \leq b \leq 0.2$.

An orthorhombic Na-containing niobium titanium composite oxide can have a lithium insertion-and-extraction potential of from 1.2 V to 1.4 V (vs. Li/Li$^+$). Thus, the electrode according to first embodiment that includes a first composite oxide of the orthorhombic Na-containing niobium titanium composite oxide is combined with a positive electrode, so that it is possible to realize a nonaqueous electrolyte battery having a higher battery voltage than the case where an electrode obtained by using a spinel-type lithium titanate is used.

The orthorhombic Na-containing niobium titanium composite oxide can exhibit a charge-discharge curve with a large change in potential accompanying a change in state-of-charge within the operating potential range. Accordingly, in the case of the orthorhombic Na-containing niobium titanium composite oxide, it is easy to grasp the state-of-charge based on the potential.

However, the present inventors' dedicated studies have revealed that a nonaqueous electrolyte battery produced by using the orthorhombic Na-containing niobium titanium composite oxide is poor in input-output performances in a high state-of-charge.

The present inventors have been dedicated to studies in order to solve the problem associated with the nonaqueous electrolyte battery produced by using the orthorhombic Na-containing niobium titanium composite oxide. As a result, they have arrived at the electrode according to the first embodiment.

The electrode according to the first embodiment includes a second composite oxide represented by a general formula of $Li_{2+a}Na_{2+b}Ti_6O_{14}$ ($-0.2 \leq a \leq 2$, $-0.2 \leq b \leq 0.2$), in addition to the orthorhombic Na-containing niobium titanium composite oxide as the first composite oxide. The second composite oxide can have a lithium insertion-and-extraction potential of about 1.25 V (vs. Li/Li$^+$) and exhibit a charge-discharge curve with a relatively small change in potential accompanying a change in state-of-charge in such a lithium insertion-and-extraction potential.

In the case of the electrode according to the first embodiment that includes the second composite oxide, in addition to the first composite oxide of the orthorhombic Na-containing niobium titanium composite oxide, in a low state-of-charge, Li can be inserted into and extracted from the first composite oxide of the orthorhombic Na-containing niobium titanium composite oxide. On the other hand, in a high state-of-charge, Li can be inserted into and extracted from the second composite oxide. As described above, the second composite oxide can exhibit a charge-discharge curve with a relatively small change in potential accompanying a change in state-of-charge. Thus, it is possible to reduce a change in potential during input and output in the high state-of-charge. As a result, the electrode according to the first embodiment can realize a nonaqueous electrolyte battery which can exhibit an excellent input-and-output performances in a high state of charge.

Subsequently, charge curves of an example of the first composite oxide of the orthorhombic Na-containing niobium titanium composite oxide, an example of the second composite oxide represented by a general formula of $Li_{2+a}Na_{2+b}Ti_6O_{14}$ ($-0.2 \leq a \leq 2$, $-0.2 \leq b \leq 0.2$), and an example of the electrode according to the first embodiment are specifically shown.

FIG. 1 is a charge curve of an orthorhombic Na-containing niobium titanium composite oxide of $Li_2Na_{1.7}Ti_6Nb_{0.3}O_{14}$. FIG. 2 is a charge curve of a composite oxide of $Li_2Na_2Ti_6O_{14}$. FIG. 3 shows a charge curve of an example of an electrode according to a first embodiment.

As shown in FIG. 1, the composite oxide of $Li_2Na_{1.7}Ti_{5.7}Nb_{0.3}O_{14}$ has a lithium insertion-and-extraction potential of from 1.1 V to 1.6 V (vs. Li/Li$^+$). Within a range of from 10% SOC to 90% SOC (SOC: state-of-charge), excluding parts at final stages of charge and discharge where a change in potential is large, the composite oxide has a lithium insertion-and-extraction potential of from 1.2 V to 1.5 V (vs. Li/Li$^+$). Further, the composite oxide of $Li_2Na_{1.7}Ti_{5.7}Nb_{0.3}O_{14}$ can vary in potential accompanying a change in state-of-charge within the lithium insertion-and-extraction potential range. Particularly, as is apparent from FIG. 1, the composite oxide of $Li_2Na_{1.7}Ti_{5.7}Nb_{0.3}O_{14}$ exhibits a large change in potential accompanying a change in high state-of-charge.

On the other hand, as shown in FIG. 2, the composite oxide of $Li_2Na_2Ti_6O_{14}$ has a lithium insertion-and-extraction potential of from 1.2 V to 1.6 V (vs. Li/Li$^+$). Within a range of from 10% SOC to 90% SOC, excluding parts at final stages of charge and discharge where a change in potential is large, the composite oxide has a lithium insertion-and-extraction potential of from 1.25 V to 1.45 V (vs. Li/Li$^+$). Further, the composite oxide of $Li_2Na_2Ti_6O_{14}$ shows a relatively small change in lithium insertion-and-extraction potential accompanying a change in state-of-charge. Particularly, as is apparent from FIGS. 1 and 2, the composite oxide of $Li_2Na_2Ti_6O_{14}$ shows a small change in potential accompanying a change in state-of-charge in a high state-of-charge, compared to the composite oxide of $Li_2Na_{1.7}Ti_{5.7}Nb_{0.3}O_{14}$.

The charge curve shown in FIG. 3 is a charge curve of an electrode that includes the composite oxide of $Li_2Na_{1.7}Ti_{5.7}Nb_{0.3}O_{14}$ and the composite oxide of $Li_2Na_2Ti_6O_{14}$ at a mass ratio of 72:18. As shown in FIG. 3, the example of the electrode has a lithium insertion-and-extraction potential of from 1.2 V to 1.6 V (vs. Li/Li$^+$). In other words, the example of the electrode can has a lithium insertion-and-extraction potential lower than that of an electrode containing a spinel-type lithium titanate. As shown in FIG. 3, the example of the electrode in the high state-of-charge shows a relatively small change in potential accompanying a change in state-of-charge. As a result, the example of the electrode can, in a high state-of-charge, reduce a change in potential during input and output. Therefore, a nonaqueous electrolyte battery produced by using the example of the electrode can exhibit excellent input-and-output performances in a high state-of-charge.

Subsequently, the electrode according to the first embodiment will be described in detail.

The orthorhombic Na-containing niobium titanium composite oxide as the first composite oxide can be represented, for example, by a general formula of $Li_{2+v}Na_{2-w}M1_x Ti_{6-y-z}Nb_yM2_zO_{14+\delta}$.

In the general formula of $Li_{2+v}Na_{2-w}M1_x Ti_{6-y-z}Nb_yM2_zO_{14+\delta}$, the subscript v can have a value of $0 \leq v \leq 4$, depending to the state-of-charge of the orthorhombic Na-containing niobium titanium composite oxide which can be represented by the general formula.

In the general formula, the subscript w corresponds to the amount of Na included in the orthorhombic Na-containing niobium titanium composite oxide. The lithium insertion-and-extraction potential of the orthorhombic Na-containing niobium titanium composite oxide can be adjusted, for example, by the amount of Na in the composite oxide. The subscript w may have, for example, a value $0 < w < 2$. The subscript w preferably has a value of from 0.1 to 1.

In the general formula, the subscript x corresponds to the amount of a metallic element M1 included in the orthorhombic Na-containing niobium titanium composite oxide. The metallic element M1 may be at least one metal element selected from the group consisting of Cs, K, Sr, Ba and Ca. The metallic element M1 can be one metallic element selected from the group consisting of Cs, K, Sr, Ba and Ca. Alternatively, the metallic element M1 can include two or more metallic elements selected from the group consisting of Cs, K, Sr, Ba and Ca. The subscript x may have, for example, a value within a range of $0 \leq x < 2$. Thus, the orthorhombic Na-containing niobium titanium composite oxide does not need to include the metallic element M1. The subscript x preferably has a value of from 0.05 to 0.2. The range of the subscript x is within the range so that an orthorhombic Na-containing niobium titanium composite oxide having an excellent rate performance can be obtained.

In an aspect, the metallic element M1 includes Cs. When Cs is included, a more excellent cycle performance can be achieved. In another aspect, the metallic element M1 includes K. When K is included, a more excellent cycle performance can be achieved. In another aspect, the metallic element M1 includes Sr. When Sr is included, a more excellent rate performance can be achieved. In another aspect, the metallic element M1 includes Ba. When Ba is included, a more excellent rate performance can be achieved. In another aspect, the metallic element M1 includes Ca. When Ca is included, a more excellent rate performance can be achieved. The metallic element M1 preferably includes at least one of Sr and Ba.

In the general formula, the subscript y corresponds to the amount of niobium included in the orthorhombic Na-containing niobium titanium composite oxide. The subscript y may have, for example, a value within a range of $0<y\leq 6$. The subscript y preferably has a value of from 0.1 to 1. The value of the subscript y is within the range so that an orthorhombic Na-containing niobium titanium composite oxide having an excellent rate performance can be obtained.

In the general formula, the subscript z corresponds to the amount of a metallic element M2 included in the orthorhombic Na-containing niobium titanium composite oxide. The metallic element M2 may be at least one metallic element selected from the group consisting of Zr, Sn, V, Ta, Mo, W, Fe, Co, Mn and Al. The metallic element M2 can be one one metallic element selected from the group consisting of Zr, Sn, V, Ta, Mo, W, Fe, Co, Mn and Al. Alternatively, the metallic element M2 can include two or more metallic elements selected from the group consisting of Zr, Sn, V, Ta, Mo, W, Fe, Co, Mn and Al. The subscript z may have, for example, a value with in a range of $0\leq z<3$. Thus, the orthorhombic Na-containing niobium titanium composite oxide does not need to include the metallic element M2. The subscript z preferably has a value of from 0.1 to 0.3. When the value of the subscript z is within the range, an excellent rate performance can be obtained.

In an aspect, the metallic element M2 includes Zr. When Zr is included, a more excellent cycle performance can be achieved. In another aspect, the metallic element M2 includes Sn. When Sn is included, a more excellent rate performance can be achieved. In another aspect, the metallic element M2 includes V. V can exhibit the same physical and chemical properties as those of Nb. In another aspect, the metallic element M2 includes Ta. Ta can exhibit the same physical and chemical properties as those of Nb. In another aspect, the metallic element M2 includes Mo. When Mo is included, a more excellent rate performance can be achieved. In another aspect, the metallic element M2 includes W. When W is included, a more excellent rate performance can be achieved. In another aspect, the metallic element M2 includes Fe. When Fe is included, a more excellent cycle performance can be achieved. In another aspect, the metallic element M2 includes Co. When Co is included, a more excellent cycle performance can be achieved. In another aspect, the metallic element M2 includes Mn. When Mn is included, a more excellent cycle performance can be achieved. In another aspect, the metallic element M2 includes Al. When Al is included, a more excellent rate performance can be achieved. The metallic element M2 preferably includes at least one selected from the group consisting of Al, Zr, Sn and V.

The subscript δ may correspond to a deviation in amount of oxygen in the orthorhombic Na-containing niobium titanium composite oxide which can be represented by the general formula of $Li_{2+v}Na_{2-w}M1_xTi_{6-y-z}Nb_yM2_zO_{14}$. A negative value of the subscript δ may mean that the amount of oxygen is low with respect to the stoichiometric ratio. On the other hand, a positive value of the subscript δ may mean that the amount of oxygen is high with respect to the stoichiometric ratio. The subscript δ preferably has a value within a range of $-0.5\leq\delta\leq 0.5$. The value of the subscript δ is within the range so that a balance between a rate performance and a cycle life performance is achieved. The subscript δ more preferably has a value within a range of $-0.1\leq\delta\leq 0.1$.

The negative electrode according to the first embodiment may include one of the orthorhombic Na-containing niobium titanium composite oxides or may contain two or more orthorhombic Na-containing niobium titanium composite oxides.

The second composite oxide is represented by a general formula of $Li_{2+a}Na_{2+b}Ti_6O_{14}$. Here, the subscript a has a value of $-0.2\leq a\leq 2$, whereas the subscript b has a value of $-0.2\leq b\leq 0.2$.

The subscript a corresponds to the amount of Li in the second composite oxide. The subscript a may have a value of $-0.2\leq a\leq 2$.

The subscript b corresponds to the amount of Na in the second composite oxide. The value of the subscript b changes, whereby the operating potential and rate performance change. When the value is from −0.2 to 0.2, the operating potential does not largely change and it is possible to improve an input performance in a high SOC. The value of the subscript b may be 0. The subscript b preferably has a value of $-0.2\leq b\leq 0$. The value of the subscript b is within the range so that an more excellent rate performance can be achieved.

The second composite oxide represented by the general formula of $Li_{2+a}Na_{2+b}Ti_6O_{14}$ can have, for example, an orthorhombic crystal structure. The space group is Fmmm, for example. The orthorhombic Na-containing niobium titanium composite oxide also has an orthorhombic crystalline structure; however, the orthorhombic Na-containing niobium titanium composite oxide includes Nb or another metallic element, and therefore, the crystal lattice constant changes. Furthermore, the space group of the orthorhombic Na-containing niobium titanium composite oxide may be not only Fmmm but also Cmca depending on the elemental composition.

The first composite oxide of the orthorhombic Na-containing niobium titanium composite oxide may be included in an electrode, for example, as primary particles. The primary particles of the first composite oxide preferably have an average particle size $D_A$ within a range of from 200 nm to 5 μm. When the average particle size $D_A$ of the primary particles of the first composite oxide is within a range of from 200 nm to 5 μm, it is possible to achieve an excellent balance between easiness of formation of electrodes and improvement effect of input-and-output performances in a high state-of-charge. The primary particles of the first composite oxide more preferably have an average particle size $D_A$ with in a range of from 500 nm to 2 μm.

The second composite oxide may be included in an electrode, for example, as primary particles. The primary particles of the second composite oxide preferably have an average particle size $D_B$ within a range of from 50 nm to 2 μm. If the average particle size $D_B$ of the primary particles of the second composite oxide is within a range of from 50 nm to 2 μm, an excellent balance between easiness of formation of electrodes and improvement effect of input-and-output performances in a high state-of-charge can be achieved. The primary particles of the second composite oxide more preferably have an average particle size $D_B$ within a range of from 200 nm to 1 μm.

An average particle size $D_B$ of the primary particles of the second composite oxide is preferably smaller than the average particle size $D_A$ of the primary particles of the first composite oxide. The electrode according to the preferred aspect can exhibit more excellent input-and-output performances in a high state-of-charge. The $D_B$ is smaller than the $D_A$, whereby an improvement effect of an input performance in a SOC, which is caused by $Li_{2+a}Na_{2+b}Ti_6O_{14}$ included in the electrode, is further increased. The average particle size ratio $D_A/D_B$ is preferably within a range of from 1.2 to 7.

Each of the first composite oxide and the second composite oxide may be in the form of secondary particles formed of aggregated primary particles.

The secondary particles of the first composite oxide preferably have an average particle size $D_C$ of from 6 μm to 20 μm. An electrode according to a preferred aspect which includes the first composite oxide in the form of secondary particles having an average particle size $D_C$ within the above range can exhibit an excellent cycle performance because the first composite oxide is included in the form of secondary particles and can also exhibit a more excellent rate performance. The secondary particles of the first composite oxide more preferably have an average particle size $D_C$ of from 8 μm to 15 μm.

The secondary particles of the second composite oxide more preferably have an average particle size $D_D$ of from 6 μm to 10 μm. An electrode according to a preferred aspect which includes the second composite oxide in the form of secondary particles having an average particle size $D_D$ within the above range can exhibit an excellent cycle performance because the second composite oxide is included in the form of secondary particles and can also exhibit a more excellent rate performance. The secondary particles of the second composite oxide more preferably have an average particle size $D_D$ of from 6 μm to 8 μm.

The first composite oxide can exhibit a high reversible capacity per unit weight, compared to the second composite oxide. Accordingly, the content of the second composite oxide in the electrode is preferably low from the viewpoint of battery capacity. Hence, in the electrode, the second composite oxide preferably has a mass $W_B$ smaller than a mass $W_A$ of the first composite oxide.

The ratio of the mass $W_A$ of the first composite oxide to the total of the mass $W_A$ of the first composite oxide and the mass $W_B$ of the second composite oxide (namely, the mass ratio $W_A/(W_A+W_B)$) is preferably from 50% to 95%. The use of the electrode according to the preferred aspect can provide a nonaqueous electrolyte battery which can exhibit more excellent input-and-output performances in a high state-of-charge and in which it is possible to sufficiently grasp the state-of-charge based on the change in battery voltage accompanying a change in state-of-charge. The mass ratio $W_A/(W_A+W_B)$ is more preferably from 60% to 80%.

Subsequently, the electrode according to the first embodiment will be described in more detail.

The electrode may include a current collector and an electrode layer (active material-containing layer). The electrode layer may be formed on one surface or both surfaces of the current collector. The electrode layer may include an active material and optionally a conductive agent and a binder.

The first composite oxide and the second composite oxide may be included in the electrode layer, for example, as active materials.

The conductive agent can have the effect of improving current collection performance and suppressing the contact resistance of the active material with the current collector. Examples of the conductive agent include carbonaceous substances such as acetylene black, carbon black, graphite, carbon nanofiber, and carbon nanotube. These carbonaceous substances may be used singly or a plurality of the carbonaceous substances may be used.

The binder can have the effect of binding the active material, the conductive agent, and the current collector. Examples of the binder include polytetrafluoroethylene (PTFE), polyvinylidene fluoride (PVdF), fluorine-based rubber, styrene butadiene rubber, acrylic resin, copolymers of acrylic resin, polyacrylic acid, and polyacrylonitrile.

As for the blending ratio of the active material, the conductive agent and the binder, it is preferable that the content of the active material is from 70% by mass to 96% by mass, the content of the conductive agent is from 2% by mass to 28% by mass, and the content of the binder is from 2% by mass to 28% by mass. The amount of the conductive agent is set to 2% by mass or more, whereby the current collection performance of the electrode layer is improved, and the excellent large current performance is expected. Further, the amount of the binder is set to 2% by mass or more, whereby the adhesion between the electrode layer and the current collector is sufficient and an excellent cycle performance is expected. On the other hand, from the viewpoint of performance of high capacity, the content of each of the conductive agent and the binder is preferably 28% by mass or less.

The current collector is preferably formed of aluminum foil or aluminum alloy foil containing an element such as Mg, Ti, Zn, Mn, Fe, Cu or Si.

<Example of Production Method>

Subsequently, an example of the method for producing the electrode according to the first embodiment will be described.

[Preparation of First Composite Oxide]

At first, a first composite oxide is provided. The first composite oxide can be provided, for example, by the following procedures.

The first composite oxide of an orthorhombic Na-containing niobium titanium composite oxide can be synthesized, for example, by a solid-state reaction method. The first composite oxide can be synthesized by a wet synthesis method such as a sol-gel method or a hydrothermal method.

Hereinafter, an example of a method for synthesizing an orthorhombic Na-containing niobium titanium composite oxide by the solid-state reaction method will be described.

First, necessary raw materials for the target composition, among Ti sources, Li sources, Na sources, Nb sources, metallic element M1 sources, and metallic element M2 sources, are provided. These raw materials may be, for example, an oxide, a compound or a salt. The above salt is preferably a salt such as carbonate and nitrate that is decomposed at a relatively low temperature to generate an oxide.

Next, the raw materials thus provided are mixed in an appropriate stoichiometric ratio to obtain a mixture. For example, in the case where an orthorhombic Na-containing niobium-titanium composite oxide represented by the composition formula of $Li_2Na_{1.7}Ti_{5.7}Nb_{0.3}O_{14}$ is synthesized, titanium oxide $TiO_2$, lithium carbonate $Li_2CO_3$, sodium carbonate $Na_2CO_3$, and niobium (V) hydroxide $Nb(OH)_5$ are mixed such that the molar ratio of Li:Na:Ti:Nb in the mixture is 2:1.7:5.7:0.3.

When mixing the raw materials, it is preferable to mix after the raw materials are sufficiently ground. By mixing sufficiently ground raw materials, raw materials are more likely to react with each other and the generation of impurities when the orthorhombic Na-containing niobium-titanium composite oxide is synthesized can be suppressed. Furthermore, Li and Na may be mixed more than predetermined amounts thereof. Particularly, the loss of Li during heat treatment is a concern and thus, Li may be input more than the predetermined amount thereof.

Next, the mixture obtained by the above mixing is subjected to heat treatment in the air atmosphere at a temperature within a range of from 800° C. to 1000° C. for a time of 1 hour to 24 hours. If the temperature is 800° C. or lower, it is difficult to obtain adequate crystallinity. On the other hand, if the temperature is 1000° C. or higher, particle growth proceeds too much and coarse particles are formed, which is not preferable. Similarly, if the heat treatment time is less than 1 hour, it is difficult to obtain adequate crystallinity. If the heat treatment time is made longer than 24 hours, particle growth proceeds too much and coarse particles are formed, which is not preferable.

It is preferable to subject the mixture to heat treatment at a temperature within a range of from 850° C. to 950° C. for a time of 2 hours to 5 hours. An orthorhombic Na-containing niobium-titanium composite oxide can be obtained by such heat treatment. The obtained orthorhombic Na-containing niobium-titanium composite oxide may be recovered and then annealed.

For example, an orthorhombic Na-containing niobium-titanium composite oxide represented by the composition formula of $Li_2Na_{1.7}Ti_{5.7}Nb_{0.3}O_{14}$ can be obtained by subjecting the mixture obtained by, as described above, mixing the raw materials to heat treatment in the air atmosphere at 900° C. for 3 hours.

The particle size $D_A$ of the primary particles of the first composite oxide and the particle size $D_C$ of the secondary particles of the first composite oxide can be controlled by the temperature and time of the heat treatment as described above.

[Preparation of Second Composite Oxide]

On the other hand, a second composite oxide is provided.

The particle size $D_B$ of the primary particles of the second composite oxide and the particle size $D_D$ of the secondary particles of the second composite oxide can be controlled by the temperature and time of the heat treatment during synthesis.

[Preparation of Electrode Slurry]

Subsequently, the first and second composite oxides thus provided are used to prepare an electrode slurry.

The electrode slurry can be prepared by adding the first and second composite oxides, an optional conductive agent, and an optional binder into a solvent, and dispersing them in the solvent.

It is preferable that the first and second composite oxides in the form of powder are mixed together before addition to the solvent, and then the powder mixture is added to the solvent. In the slurry thus prepared, the conductive agent is easily brought in contact with both the first composite oxide and the second composite oxide. By using the slurry, an electrode which can provide a nonaqueous electrolyte battery exhibiting more excellent input-and-output performances can be manufactured.

Alternatively, the first and second composite oxides can be mixed when they are suspended in the solvent together with the conductive agent and the binder, and mixed to prepare a slurry.

In the preparation of the slurry, the dispersion is performed by using a planetary mixer or a bead mill in order to uniformly mix the first and second composite oxides with the conductive agent. However, when a physically too-strong force is applied to the input materials during dispersion of the slurry, the crystallinity of the surfaces of the first composite oxide particles and that of the surfaces of the second composite oxide particles may be reduced and life-time performance may be deteriorated. Accordingly, it is necessary to adjust the dispersion conditions.

[Production of Electrode]

The slurry thus prepared is applied to one surface or both surfaces of a current collector, followed by drying the coating film. Thus, an electrode layer can be formed. After that, the electrode layer is pressed. Thus, the electrode according to the first embodiment can be obtained.

<Various of Measurement Methods>

(Method for Identifying Composite Oxide Included in Electrode)

The composite oxide included in the electrode can be identified by the following procedure.

(Collection of Sample)

First, a battery including an electrode to be measured is provided. Next, Li which has been inserted into an active material included in the electrode to be measured is extracted from the active material. For example, if the electrode to be measured is a negative electrode, the battery is discharged to a fully discharged state.

Subsequently, the battery is disassembled and only the electrode to be measured is taken out. In this case, the electrode is taken out after being immersed in a solvent (ethyl methyl carbonate) and then dried. The disassembling, cleaning, and drying are performed in an argon atmosphere.

(Identification of Composition of Particles Included in Electrode Based on Combined Use of SEM and EDX)

A cross section of the electrode thus taken out is cut-out with an ion milling device. The cross section of the electrode is observed with a scanning electron microscope (SEM). Sampling is performed in an inert atmosphere such as argon or nitrogen without being exposed to the air.

Some particles are randomly selected using an SEM observation image at a magnification of 3000. In the case where it is difficult to determine the particle diameter at a magnification of 3000 due to the smallness of the particles, the magnification may be increased. At that time, the particles are selected so that the particle size distribution of the selected particles is as broad as possible.

Subsequently, each of the selected particles is subjected to elemental analysis by energy dispersive X-ray spectroscopy (EDX). Thus, it is possible to identify the kind and amount of elements other than Li among the elements included in each of the selected particles. As for Li, it is possible to obtain information on the content of Li in the active material included in the electrode by inductively coupled plasma (ICP) atomic emission spectrometry, to be described later.

(Identification of Crystalline Structure of Compound Included in Particles by XRD)

The crystalline structure of the compound included in each of the particles selected by SEM can be identified by X-ray diffraction (XRD).

The XRD measurement of the electrode can be performed by cutting the electrode to be measured into a size having the same area of the holder of the wide-angle X-ray diffractometer and directly attaching the cut electrode to the glass holder, and measuring it. At this time, XRD is measured in advance with regard to the kind of the metal foil of the electrode current collector to determine a position where a peak originating from the current collector appears. Furthermore, it is necessary to determine in advance whether or not there are peaks originated from the ingredients such as a conductive agent and binder. When the peak of the current collector is overlapped on the peak of the active material, it is desired to separate the active material from the current collector prior to the measurement. This is to separate the overlapped peaks and to measure the peak intensity quantitatively. Of course, the procedure may be omitted if these data have been determined in advance. Although the electrode may be separated physically, it is easily separated by applying ultrasonic waves in a solvent. Then, the electrode recovered in this manner can be subjected to wide-angle X-ray diffraction for the active material.

The measurement can be performed by using Cu—Kα rays as a radiation source and setting a measurement range to a range of $10°≤2θ≤90°$ to obtain the X-ray diffraction pattern.

As an apparatus for powder X-ray diffraction measurement, SmartLab manufactured by Rigaku is used. Measurement is performed under the following condition: Cu target; 45 kV, 200 mA; soller slit: 5 degrees in both incident light and received light; step width: 0.02 deg; scan speed: 20 deg/min; semiconductor detector: D/teX Ultra 250; sample plate holder: flat glass sample plate holder (0.5 mm in thickness); measurement range: $5°≤2θ≤90°$. When another apparatus is used, measurement using a standard Si powder for powder X-ray diffraction is performed under conditions where a peak intensity and a peak top position correspond to those by obtained using the above apparatus so as to obtain measurement results equivalent to those described above.

The X-ray diffraction (XRD) pattern obtained herein must be applicable to Rietveld analysis. In order to collect the data for Rietveld analysis, the measurement time or X-ray intensity is appropriately adjusted in such a manner that the step width is made ⅓ to ⅕ of the minimum half width of the diffraction peaks, and the intensity at the peak position of strongest reflected intensity is 5,000 cps or more.

The XRD pattern obtained as described above is analyzed by the Rietveld method. In the Rietveld method, the diffraction pattern is calculated from the crystal structure model which has been previously estimated. The parameters of the crystal structure (lattice constant, atomic coordinate, and occupancy ratio or the like) can be precisely analyzed by fitting all the calculated values and measurement values. Thereby, the characteristics of the crystal structure of the synthesized composite oxide can be determined. The site occupancy ratio of constitutional elements in each of the sites can be examined. A fitting parameter S is used as the scale for estimating the degree of agreement between the measured intensities and the calculated intensities in the Rietveld analysis. The S value must be less than 1.8 in the analysis. When determining the occupancies in each of the sites, the standard deviation $σ_j$ must be taken into consideration. The fitting parameter S and standard deviation $σ_j$ defined herein are estimated using the formula described in "Funmatsu X sen Kaisetsu no Jissai (Reality of Powder X-Ray Analysis", X-Ray Analysis Investigation Conversazione, The Japan Society for Analytical Chemistry, written and edited by Izumi Nakai and Fujio Izumi (Asakura Publishing Co., Ltd.).

By the above methods, information on the crystalline structure of the composite oxide included in the particles to be measured can be obtained. For example, in the case where the composite oxide included in the measured particles has an orthorhombic crystalline structure, an X-ray diffraction pattern belonging to an orthorhombic space group such as Cmca and Fmmm is obtained.

The results of identification of the composition by SEM and EDx, identification of the crystalline structure by XRD, and ICP emission spectral analysis regarding each of the particles included in the electrode are combined so that the composition and crystalline structure of the composite oxide included in each of the particles can be identified. Hence, by the above methods, the composite oxide included in the electrode to be identified. On the other hand, the first composite oxide and the second composite oxide have a similar crystalline structure. Thus, a mixture of these substances is measured by XRD and the peak position of the resultant diffraction patterns of these substances are close to each other and overlapped depending on the peaks. Consequently, it is difficult to discriminate between the first composite oxide and the second composite oxide by only XRD.

(Method for Measuring Average Primary Particle Size and Average Secondary Particle Size for Particles)

The average primary particle size and the average secondary particle size for the particles included in the electrode can be measured in the following procedure.

In the SEM observation of the electrode described above, an image of the section of an active material layer at a magnification of 3000 is obtained. In the obtained field, the particle group in which primary particles are confirmed to be in contact with each other is used as secondary particles. In the case where it is difficult to discriminate between coarse primary particles and secondary particles, observation of scanning ion microscopy (SIM) images makes the discrimination process easy in some cases. Since the contrast in the SIM images varies depending on the crystal plane orientation of the particles, it is easy to discriminate between an aggregate of primary particles having different plane orientations and coarse primary particles.

The size of a primary particle is calculated from a diameter of the minimum circle corresponding to a primary particle. Specifically, in the SEM image at a magnification of 3000, the particle size measurement is carried out ten times and an average of the diameters of minimum circles obtained in each of the measurements is defined as a primary particle size. Maximum and minimum values of the particle sizes of ten-times measurements are not used for calculation.

The primary particle size measurement is performed on ten primary particles identified as the particles of the first composite oxide by the method described above. The average of the measured primary particle sizes is defined as an average primary particle size $D_A$ of the particles of the first composite oxide. Similarly, the primary particle size measurement is performed on ten primary particles identified as the particles of the second composite oxide by the method described above. The average of the measured primary particle sized is defined as an average primary particle size $D_B$ of the particles of the second composite oxide.

The secondary particle size is measured by the same method as the primary particles. Hence, a diameter of the minimum circle corresponding to a secondary particle is measured. Specifically, in the SEM image at a magnification of 3000, the particle size measurement is carried out ten times and an average of the diameters of minimum circles obtained in each of the measurements is defined as a secondary particle size. Maximum and minimum values of the particle sizes of ten-times measurements are not used for calculation.

The secondary particle size measurement is performed on ten secondary particles identified as the particles of the first composite oxide by the method described above. The average of the measured secondary particle sizes is defined as an average secondary particle size $D_C$ of the particles of the first composite oxide. Similarly, the secondary particle size measurement is performed on ten secondary particles identified as the particles of the second composite oxide by the method described above. The average of the measured secondary particle sizes is defined as an average primary particle size $D_D$ of the particles of the second composite oxide.

(Method for Quantifying Amount of Composite Oxide Included in Electrode)

The amount of the composite oxide included in the electrode can be measured in the following procedure.

According to the procedure described above, the electrode including the active material to be measured is taken out from the nonaqueous electrolyte battery and washed.

One portion of the washed electrode is used. The composition of the composite oxide included in the electrode is identified by the method described above.

On the other hand, the other portion of the electrode washed is placed in an appropriate solvent and irradiated with ultrasonic waves. For example, the electrode body is placed in ethyl methyl carbonate in a glass beaker and the beaker is vibrated in an ultrasonic bath so that the electrode layer including an electrode active material can be peeled off from the current collector substrate. Then, the peeled electrode layer is dried under reduced pressure. The obtained electrode layer is ground in a mortar into a powder including a composite oxide as a target active material, a conductive auxiliary agent, and a binder. This powder is dissolved in acid to produce a liquid sample including the composite oxide. At this time, hydrochloric acid, nitric acid, sulfuric acid, and hydrogen fluoride may be used as the acid. This liquid sample is subjected to ICP emission spectral analysis and thus the concentration of the element of the composite oxide included in the electrode can be determined.

From the obtained information and the information on the composition of the composite oxides included in the electrode, the content of the composite oxides included in the electrode can be found. Hence, by the method, the mass $W_A$ of the first composite oxide and the mass $W_B$ of the second composite oxide, which are included in the electrode, can be found.

Subsequently, a specific example of the electrode according to the first embodiment will be described with reference to the drawings.

FIG. 4 is a schematic cross-sectional view of the example of the electrode according to the first embodiment.

An electrode 3 shown in FIG. 4 includes a current collector 3a and an electrode layer 3b formed on both surfaces of the current collector 3a.

Although both ends of the current collector 3a are omitted in FIG. 4, the current collector may be a strip-shaped metal or an alloy foil.

The electrode layer 3b is supported on the current collector 3a. The electrode layer 3b includes the first composite oxide and the second composite oxide as described above.

The current collector 3a includes a portion (not shown) which does not support the electrode layer 3b on both surfaces. The portion can function as an electrode tab.

According to the first embodiment, there is provided an electrode. The electrode includes an orthorhombic Na-containing niobium titanium composite oxide as the first composite oxide and the second composite oxide represented by the general formula of $Li_{2+a}Na_{2+b}Ti_6O_{14}$ ($-0.2 \leq a \leq 2$, $-0.2 \leq b \leq 0.2$). In a high state-of-charge of the electrode, lithium can be inserted into and extracted from the second composite oxide. The second composite oxide can reduce a change in potential during input and output in a high state-of-charge. As a result, a nonaqueous electrolyte battery produced by using the electrode according to the first embodiment can exhibit excellent input-and-output performances in a high state-of-charge.

(Second Embodiment)

According to a second embodiment, there is provided a nonaqueous electrolyte battery. The nonaqueous electrolyte battery includes the electrode according to the first embodiment as a negative electrode, a positive electrode, and a nonaqueous electrolyte.

The nonaqueous electrolyte battery according to the second embodiment can further include a separator provided between the positive electrode and the negative electrode. The positive electrode, the negative electrode, and the separator can constitute an electrode group. The nonaqueous electrolyte may be held in the electrode group.

The nonaqueous electrolyte battery according to the second embodiment can further include a container member accommodating the electrode group and the nonaqueous electrolyte.

The nonaqueous electrolyte battery according to the second embodiment can further include a positive electrode terminal electrically connected to the positive electrode and a negative electrode terminal electrically connected to the negative electrode. At least a part of the positive electrode terminal and at least a part of the negative electrode terminal may be extended to the outside of the container member.

Hereinafter, the negative electrode, the positive electrode, the nonaqueous electrolyte, the separator, the container member, the positive electrode terminal, and the negative electrode terminal will be described in detail.

1) Negative Electrode

The negative electrode included in the nonaqueous electrolyte battery according to the second embodiment is the electrode according to the first embodiment. Since the electrode according to the first embodiment has been previously described in detail, the description of the negative electrode is not repeated herein.

2) Positive Electrode

The positive electrode can include a current collector and a positive electrode layer (positive electrode active material-containing layer). The positive electrode layer may be formed on one or both surfaces of the current collector. The positive electrode layer can include a positive electrode active material, and optionally a conductive agent and a binder.

The positive electrode active material may be, for example, an oxide or a composite oxide. Lithium can be inserted into the oxide and the composite oxide, and be extracted from them. Examples of the oxide and composite oxide include a lithium manganese composite oxide (e.g., $Li_xMn_2O_4$ or $Li_xMnO_2$), a lithium nickel composite oxide (e.g., $Li_xNiO_2$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$) a lithium nickel cobalt manganese composite oxide (e.g., $LiNi_{1-y-z}Co_yMn_zO_2$), a lithium nickel cobalt aluminum composite oxide (e.g., $LiNi_{1-y-z}Co_yAl_zO_2$), a lithium manganese nickel composite oxide having a spinel structure (e.g., $Li_xMn_{2-y}NiO_4$), a lithium phosphorus oxide having an olivine structure (e.g., $Li_xFePO_4$, $Li_xMnPO_4$, $Li_xMn_{1-y}Fe_yPO_4$, and $Li_xCoPO_4$), an iron sulfate (e.g., $Fe_2(SO_4)_3$), and a vanadium oxide (e.g., $V_2O_5$). In the above-described formula, the ranges of $0<x \leq 1$, $0<y \leq 1$, and $0 \leq z \leq 1$ are preferably. As the active material, one of these compounds may be used singly, or combination of two or more of the compounds can be used.

Among these, a lithium manganese composite oxide (e.g., $Li_xMn_2O_4$), a lithium cobalt composite oxide (e.g., $Li_xCoO_2$), a lithium nickel cobalt composite oxide (e.g., $LiNi_{1-y}Co_yO_2$), a lithium manganese cobalt composite oxide (e.g., $Li_xMn_yCo_{1-y}O_2$), a lithium nickel cobalt manganese composite oxide (e.g., $LiNi_{1-y-z}Co_yMn_zO_2$), and a lithium phosphorus oxide having an olivine structure (e.g., $Li_xFePO_4$, $Li_xMnPO_4$, $Li_xMn_{1-y}Fe_yPO_4$ and $Li_xCoPO_4$) are preferable. In the above-described formula, the ranges of $0<x\leq 1$, $0<y\leq 1$, and $0\leq z\leq 1$ are preferably.

A combination of the electrode according to the first embodiment and a positive electrode including a lithium cobalt composite oxide ($Li_xCoO_2$) can produce a nonaqueous electrolyte battery which can exhibit a high power density. In the case of such a battery, the rate of utilization of the lithium cobalt composite oxide ($Li_xCoO_2$) is increased, whereby an energy density of the battery can be improved.

A combination of the electrode according to the first embodiment and a positive electrode including a lithium nickel cobalt manganese composite oxide (e.g., $LiNi_{1-y-z}Co_yMn_zO_2$) can produce a nonaqueous electrolyte battery which can exhibit a high energy density. Further, in the case of the battery, the use range of the lithium nickel cobalt manganese composite oxide is narrowed and the upper limit potential of the positive electrode is decreased so that a nonaqueous electrolyte battery a voltage of which is relatively low, but which can exhibit a long life due to the suppression of the oxidative decomposition of the electrolyte solution. The battery voltage is thus adjusted and the battery voltage and the number of in-series are controlled in combination, whereby it becomes easy to obtain a desired voltage of the battery module. For example, the upper limit potential of the positive electrode is decreased and the number of in-series batteries is increased so that a battery module exhibiting a long life can be obtained. On the other hand, the upper limit potential of the positive electrode is increased and the number of in-series batteries is decreased so that battery module exhibiting a high energy density can be obtained.

A combination of the electrode according to the first embodiment and the positive electrode including a lithium manganese composite oxide ($Li_xMn_2O_4$) can produce a nonaqueous electrolyte battery which can exhibit a high power density.

A combination of the electrode according to the first embodiment and the positive electrode including an olivine-type lithium manganese iron phosphate compound can produce a nonaqueous electrolyte battery which can exhibit an excellent safety.

As for the nonaqueous electrolyte battery according to the second embodiment, the selection of the positive electrode active material enables the average operating voltage of the battery to be adjusted to a range of from about 2.4 V to about 2.8 V.

The conductive agent can have the effect of improving the current collection performance and suppressing the contact resistance of the active material with the current collector. Examples of the conductive agent include carbonaceous substances such as acetylene black, carbon black, graphite, carbon nano fiber, and carbon nanotube. These carbonaceous substances may be used singly or a plurality of the carbonaceous substances may be used.

The binder can have the effect of binding the active material, the conductive agent, and the current collector. Examples of the binder include polytetrafluoroethylene (PTFE), polyvinylidene fluoride (PVdF), fluorine-based rubber, styrene butadiene rubber, acrylic resin, copolymers of acrylic resin, polyacrylic acid, and polyacrylonitrile.

As for the blending ratio of the positive electrode active material, the conductive agent and the binder in the positive electrode layer, it is preferable that the content of the positive electrode active material is from 80% by mass to 96% by mass, the content of the conductive agent is from 3% by mass to 18% by mass, and the content of the binder is from 1% by mass to 17% by mass. The amount of the conductive agent is set to 3% by mass or more, whereby the above-described effect can be obtained. The amount of the conductive agent is set to 18% by mass or less, whereby decomposition of a nonaqueous electrolyte at a surface of the conductive agent can suppressed during the storage at a high temperature. The amount of the binder is set to 1% by mass or more, whereby the sufficient strength of the electrode can be obtained. If the amount of the binder is set to 17% by mass, a content of the binder, which is an insulating material, in the positive electrode is decreased, and therefore, an internal resistance can be decreased.

The current collector is preferably an aluminum foil, or an aluminum alloy foil containing one or more elements selected from Mg, Ti, Zn, Mn, Fe, Cu, and Si.

The positive electrode is produced by, for example, the following procedure. At first, a positive electrode active material, a conductive agent, and a binder are suspended in a solvent to prepare a slurry. The slurry is applied to a positive electrode current collector, the coated film is dried to form a positive electrode layer. And then, the layer is subjected to a pressing. Alternatively, a positive electrode active material, a conductive agent, and a binder are formed into pellets, and then, the pellets can be used as a positive electrode active material layer.

3) Nonaqueous Electrolyte

The nonaqueous electrolyte may be, for example, a liquid nonaqueous electrolyte or gel-like nonaqueous electrolyte. The liquid nonaqueous electrolyte is prepared by dissolving an electrolyte in an organic solvent. The concentration of the electrolyte is preferably within a range of 0.5 mol/L to 2.5 mol/L. The gel-like nonaqueous electrolyte can be prepared by mixing a liquid nonaqueous electrolyte and a polymer material to obtain a composite.

Examples of the electrolyte include lithium salts such as lithium perchlorate ($LiClO_4$), lithium hexafluorophosphate ($LiPF_6$), lithium tetrafluoroborate ($LiBF_4$), lithium hexafluoroarsenate ($LiAsF_6$), lithium trifluoromethanesulfonate ($LiCF_3SO_3$), and lithium bistrifluoromethylsulfonylimide [$LiN(CF_3SO_2)_2$]. One electrolyte of these electrolytes can be used alone, or two or more electrolytes of these electrolytes can be used in mixture. The electrolyte preferably includes $LiPF_6$.

Examples of the organic solvent include a cyclic carbonate such as propylene carbonate (PC), ethylene carbonate (EC), or vinylene carbonate; a chain carbonate such as diethyl carbonate (DEC), dimethyl carbonate (DMC), or methyl ethyl carbonate (MEC); a cyclic ether such as tetrahydrofuran (THF), 2-methyl tetrahydrofuran (2MeTHF), or dioxolane (DOX); a chain ether such as dimethoxy ethane (DME) or diethoxy ethane (DEE); acetonitrile (AN), and sulfolane (SL). One of these organic solvents can be used alone or two or more solvent can be used as a mixed solvent.

More preferred examples of organic solvent include a mixed solvent which is prepared by mixing two or more solvent selected from the group consisting of propylene carbonate (PC), ethylene carbonate (EC), diethyl carbonate (DEC), and methyl ethyl carbonate (MEC). By using such a mixed solvent, a nonaqueous electrolyte battery which is excellent in high-temperature characteristics and low-temperature characteristics can be obtained. Furthermore, an additive can be added to the nonaqueous electrolyte.

4) Separator

As the separator, for example, a porous film formed from materials such as polyethylene, polypropylene, polyethylene terephthalate, cellulose, and polyvinylidene fluoride (PVdF), nonwoven fabric made of synthetic resin or the like can be used. Further, a separator obtained by applying an inorganic compound to a porous film can also be used.

(5) Container Member

As the container member, for example, a bag-like container made of laminate film or a metallic container is used.

As the shape thereof, the flat shape, square shape, cylindrical shape, coin shape, button shape, sheet shape, and stack shape can be cited. It is needless to say that in addition to a small battery mounted on mobile electronic devices, the nonaqueous electrolyte battery may also be a large battery mounted on two-wheeled to four-wheeled automobiles.

As the laminate film, for example, a multilayer film in which a metal layer is sandwiched between resin films can be used. The metal layer is preferably aluminum foil or aluminum alloy foil to reduce the weight thereof. As the resin film, for example, a polymeric material such as polypropylene (PP), polyethylene (PE), nylon, and polyethylene terephthalate (PET) can be used. The laminate film can be formed into the shape of a container member by performing heat sealing. The laminated film preferably has a thickness of 0.2 mm or less.

The laminate film used for a container member is not limited to a multilayer film in which a metal layer is sandwiched between resin films, and a multilayer film made of a metal layer and a resin layer with which the metal layer is coated can also be used.

The container made of metal can be formed from, for example, aluminum or an aluminum alloy. The aluminum alloy preferably contains an element such as magnesium, zinc, or silicon. On the other hand, the content of transition metal such as iron, copper, nickel, and chromium is preferably reduced to 100 ppm or less. Whereby, long-term reliability and heat dissipation properties in a high-temperature environment can remarkably be improved. The wall thickness of the container made of metal is preferably 0.5 mm or less and particularly preferably 0.2 mm or less.

(6) Positive Electrode Terminal

The positive electrode terminal is preferably formed from a material that is electrically stable and has conductivity at a potential in the range of 3.0 V to 4.5 V with respect to the oxidation-reduction potential of lithium. More specifically, the positive electrode terminal is preferably formed from aluminum or an aluminum alloy containing an element such as Mg, Ti, Zn, Mn, Fe, Cu, and Si. To reduce contact resistance with the positive electrode current collector, the positive electrode terminal is preferably formed from a material similar to that of the positive electrode current collector.

(7) Negative Electrode Terminal

The negative electrode terminal is preferably formed from a material that is electrically stable and has conductivity at a potential in the range of 0.8 V to 3.0 V with respect to the oxidation-reduction potential of lithium. More specifically, the negative electrode terminal is preferably formed from aluminum or an aluminum alloy containing an element such as Mg, Ti, Zn, Mn, Fe, Cu, and Si. To reduce contact resistance with the negative electrode current collector, the negative electrode terminal is preferably formed from a material similar to that of the negative electrode current collector.

Next, the nonaqueous electrolyte battery according to the second embodiment will be more specifically described with reference to the drawings.

First, a nonaqueous electrolyte battery as an example according to the second embodiment will be described with reference to FIGS. 5 and 6.

FIG. 5 is a cross-sectional view showing a nonaqueous electrolyte battery, which is one example according to a second embodiment. FIG. 6 is an enlarged cross-sectional view showing a portion A in FIG. 5.

A nonaqueous electrolyte battery 10 shown in FIGS. 5 and 6 includes a bag-shaped container member 2 shown in FIG. 5, an electrode group 1 shown in FIGS. 5 and 6, and a nonaqueous electrolyte (not shown). The electrode group 1 and the nonaqueous electrolyte are accommodated in the container member 2. The nonaqueous electrolyte is held in the electrode group 1.

The bag-shaped container member 2 is made of a laminate film including two resin layers and a metal layer sandwiched between the resin layers.

As shown in FIG. 5, the electrode group 1 is a coiled electrode group in a flat form. The coiled electrode group 1 in a flat form is formed by, as shown in FIG. 6, spirally winding a laminate which includes, from the outside to the inside, a negative electrode 3, a separator 4, a positive electrode 5, and a separator 4, and then press-forming the wound laminate.

The negative electrode 3 includes a negative electrode current collector 3a and a negative electrode layer 3b. A part of the negative electrode 3 located in the outermost layer has a configuration in which a negative electrode layer 3b is formed on one surface which is the internal surface of a negative electrode current collector 3a as shown in FIG. 6. In the other portion of the negative electrode 3, the negative electrode layers 3b are formed on both surfaces of the negative electrode current collector 3a.

The positive electrode 5 includes a positive electrode current collector 5a and positive electrode layers 5b formed on both surfaces of the positive electrode current collector 5a.

As shown in FIG. 5, in the vicinity of the outer peripheral edge of the coiled electrode group 1, a negative electrode terminal 6 is connected to the negative electrode current collector 3a in the outermost negative electrode 3, and a positive electrode terminal 7 is connected to the positive electrode current collector 5a in the inside positive electrode 5. The negative electrode terminal 6 and the positive electrode terminal 7 are extended out from the opening of the bag-shaped container member 2.

The nonaqueous electrolyte battery 10 shown in FIGS. 5 and 6 can be produced according to the following procedure, for example. First, an electrode group 1 is produced. The electrode group 1 is then enclosed in a bag-shaped container member 2. At that time, one ends of a negative electrode terminal 6 and positive electrode terminal 7 are protruded toward the outside of the container member 2. Next, the circumference of the container member 2 is heat-sealed while a part thereof remains unsealed. Next, for example, a liquid nonaqueous electrolyte is injected via the opening of the bag-shaped container member 2 which is not heat-sealed. Finally, the opening is heat-sealed, and thereby the coiled electrode group 1 and the liquid state nonaqueous electrolyte are completely sealed.

Figure 8:
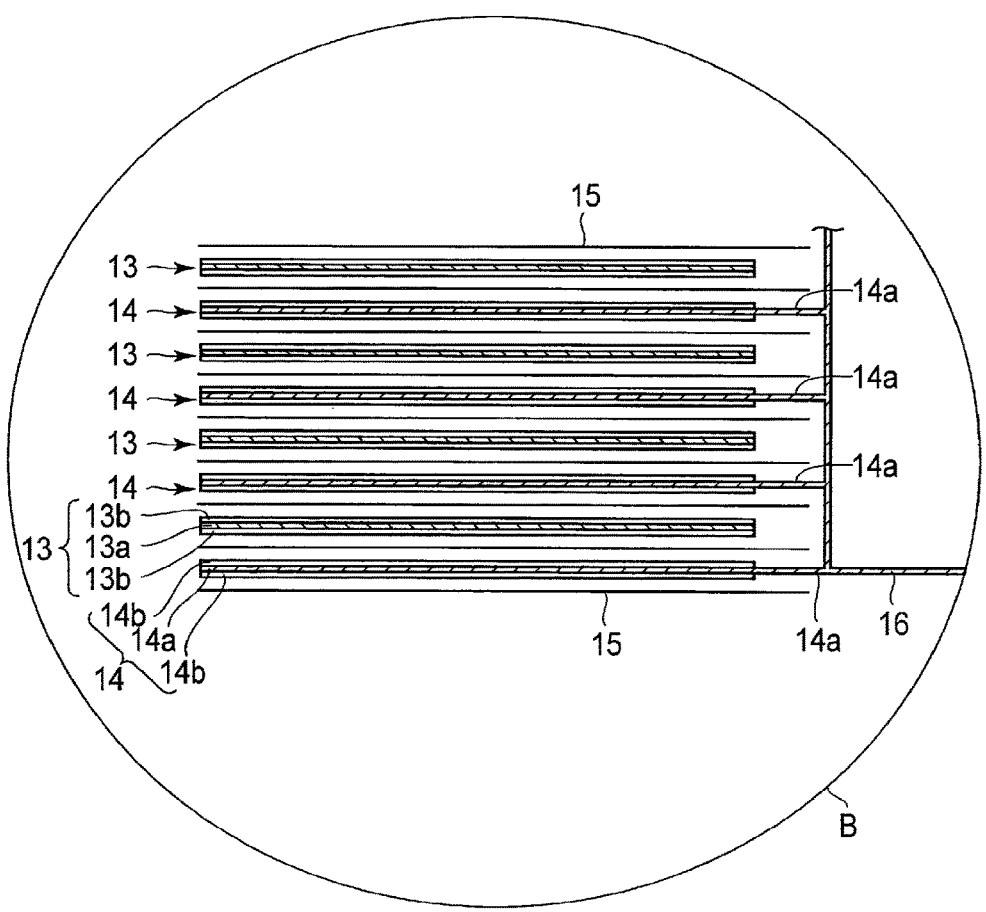
FIG. 8 is an enlarged cross-sectional view showing a portion B in FIG. 7.

The nonaqueous electrolyte battery according to the second embodiment is not limited to the nonaqueous electrolyte battery as an example shown in FIGS. 5 and 6, and may be, for example, a battery having a structure shown in FIGS. 7 and 8.

FIG. 7 is a partially cutaway perspective view schematically showing another nonaqueous electrolyte battery according to the second embodiment. FIG. 8 is an enlarged cross-sectional view showing a portion B in FIG. 7.

A nonaqueous electrolyte battery 10 shown in FIGS. 7 and 8 includes an electrode group 11 shown in FIGS. 7 and 8, a container member 12 shown in FIG. 7, and a nonaqueous electrolyte (not shown). The electrode group 11 and the nonaqueous electrolyte are accommodated in the container member 12. The nonaqueous electrolyte is held in the electrode group 11.

The container member 12 is made of a laminate film including two resin layers and a metal layer sandwiched between the resin layers.

As shown in FIG. 8, the electrode group 11 is a stacked electrode group. As shown in FIG. 8, the stacked electrode group 11 has a structure in which positive electrodes 13 and negative electrodes 14 are alternately laminated with a separator 15 sandwiched therebetween.

The electrode group 11 includes a plurality of positive electrodes 13. Each of the plurality of positive electrodes 13 includes a positive electrode current collector 13a, and a positive electrode layer 13b supported on each of the both surfaces of the positive electrode current collector 13a. The electrode group 11 includes a plurality of negative electrodes 14. Each of the plurality of negative electrodes 14 includes a negative electrode current collector 14a, and a negative electrode layer 14b supported on each of the both surfaces of the negative electrode current collector 14a. A part of the negative electrode current collector 14a of each of the negative electrodes 14 protrudes at one side from the negative electrode 14. The protruded part of the negative electrode current collector 14a is electrically connected to a strip-shaped negative electrode terminal 16. The tip of the strip-shaped negative electrode terminal 16 is extended out from the container member 12. Although not shown in the drawings, a part of the positive electrode current collector 13a of the positive electrode 13 protrudes from the positive electrode 13 at the side opposed to the protruded side of the negative electrode current collector 14a. The protruded part of the positive electrode current collector 13a from the positive electrode 13 is electrically connected to a strip-shaped positive electrode terminal 17. The tip of the strip-shaped positive electrode terminal 17 is opposed to the negative electrode terminal 16, and extended out from a side of the container member 12.

The nonaqueous electrolyte battery according to the second embodiment includes the electrode according to the first embodiment. Therefore, the nonaqueous electrolyte battery according to the second embodiment can exhibit excellent input-and-output performances in a high state-of-charge.

(Third Embodiment)

According to a third embodiment, there is provided a battery pack. The battery pack includes the nonaqueous electrolyte battery according to the second embodiment.

The battery pack according to the third embodiment can include one or more nonaqueous electrolyte batteries (unit cells) according to the second embodiment described above. The plurality of nonaqueous electrolyte batteries can be electrically connected in series, in parallel, or with a combination of series connection and parallel connection to constitute a battery module. The battery pack according to the third embodiment may include a plurality of battery modules.

The battery pack according to the third embodiment may further comprise a protective circuit. The protective circuit has a function to control charging and discharging of the nonaqueous electrolyte battery. Alternatively, a circuit included in an equipment where the battery pack serves as a power source (for example, electronic devices, vehicles, and the like) may be used as the protective circuit for the battery pack.

Moreover, the battery pack according to the third embodiment may further comprise an external power distribution terminal. The external power distribution terminal is configured to externally output the current from the nonaqueous electrolyte battery, and to input the current to the nonaqueous electrolyte battery. In other words, when the battery pack is used as a power source, the current is externally provided via the external power distribution terminal. Also, when the battery pack is charged, the charging current (including regenerative energy caused by power of vehicles such as automobiles) is provided to the battery pack via the external power distribution terminal.

Next, a battery pack as an example according to the third embodiment will be described with reference to the drawings.

Figure 9:
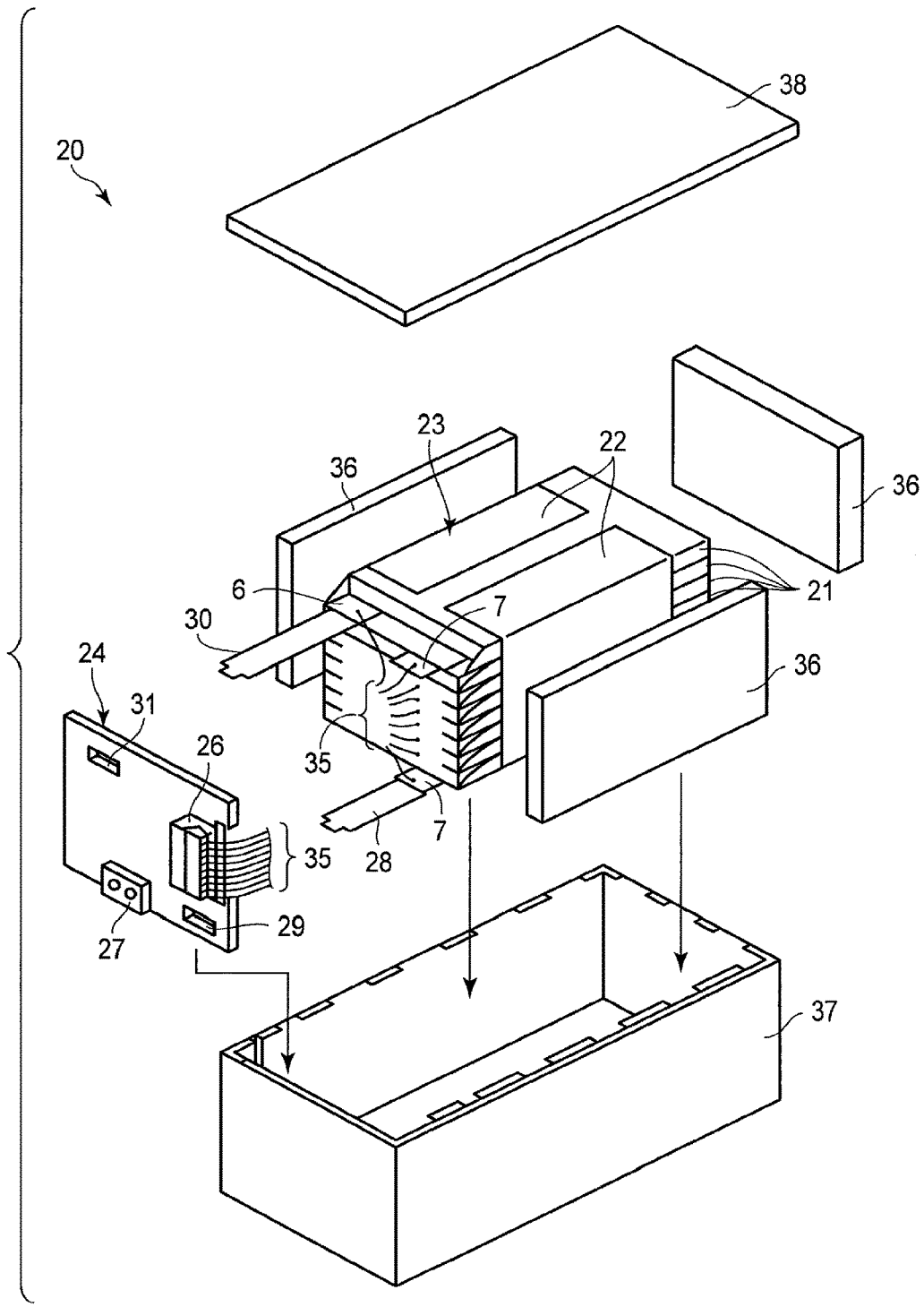
FIG. 9 is an exploded perspective view showing one example of a battery pack according to a third embodiment.
Figure 10:
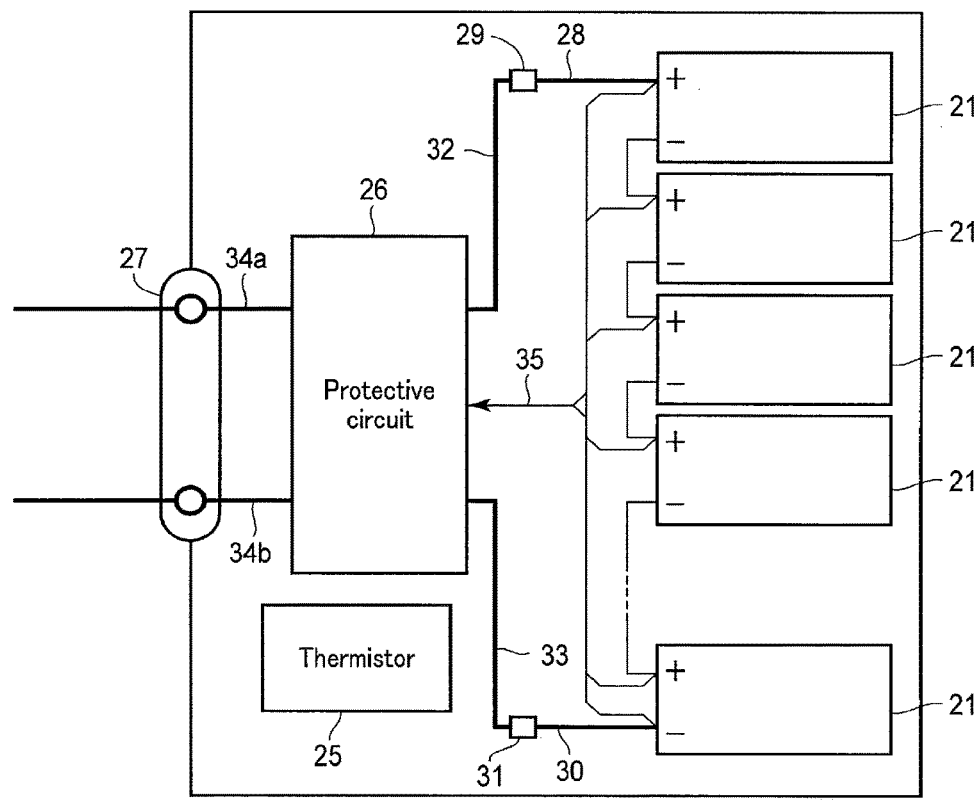
FIG. 10 is a block diagram showing an electric circuit of the battery pack in FIG. 9.

FIG. 9 is an exploded perspective view showing one example of a battery pack according to a third embodiment. FIG. 10 is a block diagram showing an electric circuit of the battery pack in FIG. 9.

A battery pack 20 shown in FIGS. 9 and 10 includes a plurality of unit cells 21. Each of the plurality of unit cells 21 is flat nonaqueous electrolyte battery 10 described with reference to FIGS. 5 and 6.

The plurality of unit cells 21 are stacked so that the negative electrode terminal 6 and the positive electrode terminal 7 extended outside are arranged in the same direction, and fastened with an adhesive tape 22 to constitute a battery module 23. The unit cells 21 are electrically connected to each other in series as shown in FIG. 10.

A printed wiring board 24 is arranged opposed to the side plane where the negative electrode terminal 6 and the positive electrode terminal 7 of the unit cell 21 are extended. A thermistor 25, a protective circuit 26, and a power distribution terminal 27 to an external device are mounted on the printed wiring board 24 as shown in FIG. 10. An electric insulating plate (not shown) is attached to the surface of the printed wiring board 24 facing the battery module 23 to avoid unnecessary connection of the wires of the battery module 23.

A positive electrode-side lead 28 is connected to the positive electrode terminal 7 located at the bottom layer of the battery module 23 and the distal end of the lead 28 is inserted into a positive electrode-side connector 29 of the printed wiring board 24 so as to be electrically connected. An negative electrode-side lead 30 is connected to the negative electrode terminal 6 located at the top layer of the battery module 23 and the distal end of the lead 30 is inserted into an negative electrode-side connector 31 of the printed wiring board 24 so as to be electrically connected. The connectors 29 and 31 are connected to the protective circuit 26 through wirers 32 and 33 formed in the printed wiring board 24.

The thermistor 25 detects the temperature of the unit cells 21 and the detection signal is sent to the protective circuit 26. The protective circuit 26 can shut down a plus-side wirer 34a and a minus-side wirer 34b between the protective circuit 26 and the power distribution terminal 27 to an external device under a predetermined condition. The predetermined condition indicates, for example, the case where the temperature detected by the thermistor 25 becomes a predetermined temperature or more. Another example of the predetermined condition indicates the case where the over-charge, over-discharge, or over-current of the unit cells 21 is detected. The detection of the over-charge and the like is performed on each of the unit cells 21 or the whole of the battery module 23. When each of the unit cells 21 is detected, the cell voltage may be detected, or positive electrode or negative electrode potential may be detected. In the case of the latter, a lithium electrode to be used as a reference electrode is inserted into each of the unit cells 21. In the case of the battery pack 20 of FIGS. 9 and 10, wirers 35 for voltage detection are connected to each of the unit cells 21. Detection signals are sent to the protective circuit 26 through the wirers 35.

Protective sheets 36 including rubber or resin are arranged on three side planes of the battery module 23 except the side plane from which the positive electrode terminal 7 and the negative electrode terminal 6 are protruded.

The battery module 23 is housed in a housing container 37 together with each of the protective sheets 36 and the printed wiring board 24. That is, the protective sheets 36 are arranged on both internal surfaces in a long side direction and on one internal surface in a short side direction of the housing container 37. The printed wiring board 24 is arranged on the other internal surface in a short side direction. The battery module 23 is located in a space surrounded by the protective sheets 36 and the printed wiring board 24. A lid 38 is attached to the upper surface of the housing case 37.

In order to fix the battery module 23, a heat-shrinkable tape may be used in place of the adhesive tape 22. In this case, the battery module is bound by placing the protective sheets on the both sides of the battery module, revolving the heat-shrinkable tape, and thermally shrinking the heat-shrinkable tape.

In FIGS. 9 and 10, the structure in which the unit cells 21 are connected to each other in series is shown. In order to increase the battery capacity, the unit cells may be connected to each other in parallel. Furthermore, the assembled battery packs can be connected to each other in series and/or in parallel.

The aspect of the battery pack according to the third embodiment may be appropriately changed depending on its application. The applications of the battery pack according to the third embodiment are preferably those for which cycle characteristics when large-current is taken out are desired. Specific examples of these applications include application as a battery of a digital camera and application to a vehicle such as a two- or four-wheeled hybrid electric vehicle, a two- or four-wheeled electric vehicle or a power-assisted bicycle. Particularly preferably, the battery pack according to the third embodiment is used for a battery mounted to a vehicle.

In a vehicle having the battery pack according to the third embodiment mounted, the battery pack is configured to, for example, recover regenerative energy caused by power of the vehicle. Examples of the vehicle include two to four-wheeled hybrid electric automobiles, two to four-wheeled electric automobiles, electric assist bicycles, and trains (electric trains).

Figure 11:
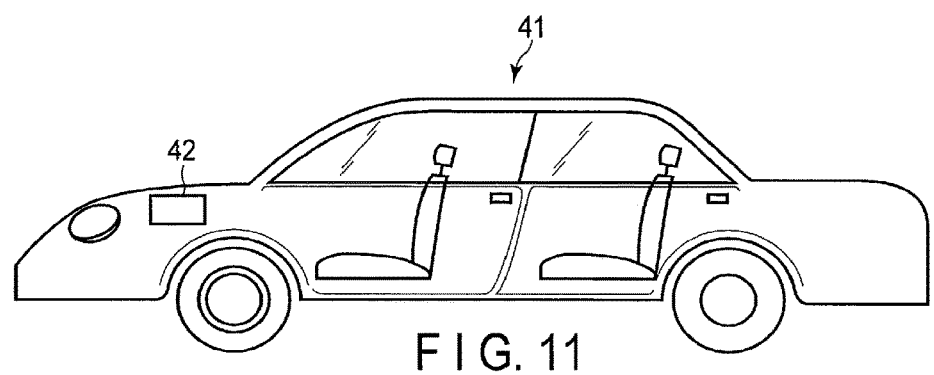
FIG. 11 is a schematic sectional view showing an example of an automobile which includes an example of a battery pack according to a third embodiment.

FIG. 11 shows an example of an automobile which includes a battery pack according to the third embodiment.

The automobile 41 shown in FIG. 11 includes a battery pack 42 which is an example of the battery pack according to the third embodiment mounted in its engine room. The mounting position is not limited to engine rooms. For example, the battery pack may also be mounted in rear parts of automobiles or under seats.

The battery pack according to the third embodiment includes the nonaqueous electrolyte battery according to the second embodiment. Therefore, the battery pack according to the third embodiment can exhibit excellent input-and-output performances in a high state-of-charge.

EXAMPLES

Hereinafter, the present invention will be described with reference to the Examples, but should not be limited to these Examples without departing from the spirit of the present invention.

Example 1

In Example 1, a nonaqueous electrolyte battery was produced by the following procedure.

[Production of Positive Electrode]

First, a powder of a lithium nickel cobalt manganese composite oxide of $LiNi_{0.33}Co_{0.33}Mn_{0.33}O_2$ was provided as a positive electrode active material. The composite oxide, acetylene black as a conductive agent, and polyvinylidene fluoride (PVdF) as a binder (blending ratio of 90% by mass:5% by mass:5% by mass) were put into a solvent of N-methyl pyrrolidone (NMP) and mixed. Then, the thus obtained mixture was dispersed using a planetary centrifugal mixer to prepare a slurry.

After that, the prepared slurry was applied to both surfaces of a current collector of 15 μm-thick aluminum foil. Then, the coating film was dried and pressed. Thus, a positive electrode having an electrode density (excluding the current collector) of 3.2 g/cm$^3$ was produced.

[Production of Negative Electrode]

First, a powder of an orthorhombic Na-containing niobium titanium composite oxide of $Li_2Na_{1.7}Ti_{5.7}Nb_{0.3}O_{14}$ was prepared by the following procedure.

As starting materials, titanium oxide ($TiO_2$), lithium carbonate ($Li_2CO_3$), sodium carbonate ($Na_2CO_3$), and niobium (V) hydroxide ($Nb(OH)_5$) were provided. These starting materials were mixed at a molar ratio of Li:Na:Ti:Nb of 2:1.7:5.7:0.3. Prior to the mixing, the starting materials were well ground.

The mixture of the starting materials was heat-treated in the air atmosphere at 900° C. for 3 hours. Thus, a powder of the product was obtained.

The average primary particle size of the obtained powder of the product was analyzed by SEM. As a result, it was found that the obtained powder of the product comprised particles in the form of primary particles having an average particle size of 3 μm.

The composition and crystalline structure of the obtained product were analyzed by ICP and X-ray diffraction. As a result, it was found that the obtained product was an orthorhombic Na-containing niobium titanium composite oxide of $Li_2Na_{1.7}Ti_{5.7}Nb_{0.3}O_{14}$. The composite oxide powder was used as the first composite oxide powder.

On the other hand, a powder of a composite oxide of $Li_2Na_2Ti_6O_{14}$ was prepared by the following procedure.

As starting materials, titanium oxide ($TiO_2$), lithium carbonate ($Li_2CO_3$), and sodium carbonate ($Na_2CO_3$) were provided. These starting materials were mixed at a molar ratio of Li:Na:Ti of 1:1:3. Prior to the mixing, the starting materials were well ground.

The mixture of the starting materials was heat-treated in the air atmosphere at 800° C. for 3 hours. Thus, a powder of the product was obtained.

The average primary particle size of the obtained powder of the product was analyzed by SEM. As a result, it was found that the obtained powder of the product included particles in the form of primary particles having an average particle size of 0.7 μm.

The composition and crystalline structure of the obtained product were analyzed by ICP and X-ray diffraction. As a result, it was found that the obtained product was an orthorhombic composite oxide of $Li_2Na_2Ti_6O_{14}$. The composite oxide powder was used as the second composite oxide powder.

Then, the first composite oxide, the second composite oxide, acetylene black as a conductive agent, and polyvinylidene fluoride (PVdF) as a binder (ratio of 72% by mass:18% by mass:5% by mass:5% by mass) were put into a solvent of N-methyl pyrrolidone (NMP) and mixed. Then, the thus obtained mixture was dispersed using a planetary centrifugal mixer to prepare a slurry.

After that, the prepared slurry was applied to both surfaces of a current collector of 15 μm-thick aluminum foil. Then, the coating film was dried and pressed. Thus, a negative electrode having an electrode density (excluding the current collector) of 2.3 g/cm³ was produced.

[Production of Electrode Group]

Subsequently, two separators formed of 25-μm-thick polyethylene porous films were provided.

Then, the positive electrode produced above, one separator, the negative electrode produced above, and the other separator were stacked in this order to obtain a laminate. The laminate was spirally wound. The resultant product was hot-pressed at 90° C. to form a flat-shaped electrode group having a width of 30 mm and a thickness of 3.0 mm.

The obtained electrode group was housed in a pack formed of a laminate film, followed by vacuum drying at 80° C. for 24 hours. The laminate film was configured to include polypropylene layers formed on both surfaces of 40-μm-thick aluminum foil and had a total thickness of 0.1 mm.

[Preparation of Liquid Nonaqueous Electrolyte]

Propylene carbonate (PC) and diethyl carbonate (DEC) were mixed at a volume ratio of 1:1 and the resultant mixture was used as a mixed solvent. $LiPF_6$ as a electrolyte was dissolved at 1 M in the mixed solvent to prepare a liquid nonaqueous electrolyte.

[Production of Nonaqueous Electrolyte Secondary Battery]

The liquid nonaqueous electrolyte was injected into the laminate film pack in which the electrode group had been housed as described above. Thereafter, the pack was completely sealed by heat sealing. Thus, a nonaqueous electrolyte battery having the structure shown in FIGS. 4 and 5, a width of 35 mm, a thickness of 3.2 mm, and a height of 65 mm was produced.

Example 2

In Example 2, a nonaqueous electrolyte battery of Example 2 was produced in the same manner as in Example 1 except that a powder of an orthorhombic Na-containing niobium titanium composite oxide of $Li_2Na_{1.9}Ti_{5.9}Nb_{0.1}O_{14}$ was used as the first composite oxide in place of the powder of $Li_2Na_{1.7}Ti_{5.7}Nb_{0.3}O_{14}$.

The powder of the first composite oxide used in Example 2 was prepared in the same procedure as the first composite oxide of Example 1 except that lithium carbonate, sodium carbonate, and niobium (V) hydroxide as starting materials were mixed so that the molar ratio of Li:Na: Ti:Nb in the mixture was 2:1.9:5.9:0.1.

In Example 2, the first composite oxide and the second composite oxide were mixed at a mass ratio of 72% by mass:18% by mass.

Example 3

In Example 3, a nonaqueous electrolyte battery of Example 3 was produced in the same manner as in Example 1 except that a powder of an orthorhombic Na-containing niobium titanium composite oxide of $Li_2Na_{1.5}Ti_{5.5}Nb_{0.5}O_{14}$ was used as the first composite oxide in place of the powder of $Li_2Na_{4.7}Ti_{5.7}Nb_{0.3}O_{14}$.

The powder of the first composite oxide used in Example 3 was prepared in the same procedure as the first composite oxide of Example 1 except that titanium oxide, lithium carbonate, sodium carbonate, and niobium (V) hydroxide as starting materials were mixed so that the molar ratio of Li:Na:Ti:Nb in the mixture was 2: 1.5:5.5:0.5.

In Example 3, the first composite oxide and the second composite oxide were mixed at a mass ratio of 72% by mass:18% by mass.

Example 4

In Example 4, a nonaqueous electrolyte battery of Example 4 was produced in the same manner as in Example 1 except that a powder of an orthorhombic Na-containing niobium titanium composite oxide of $Li_2NaTi_5NbO_{14}$ was used as the first composite oxide in place of the powder of $Li_2Na_{1.7}Ti_{5.7}Nb_{0.3}O_{14}$.

The powder of the first composite oxide used in Example 4 was prepared in the same procedure as the first composite oxide of Example 1 except that titanium oxide, lithium carbonate and sodium carbonate, and niobium (V) hydroxide as starting materials were mixed so that the molar ratio of Li:Na:Ti:Nb in the mixture was 2:1: 5:1.

In Example 4, the first composite oxide and the second composite oxide were mixed at a mass ratio of 72% by mass:18% by mass.

Example 5

In Example 5, a nonaqueous electrolyte battery of Example 5 was produced in the same manner as in Example 1 except that a powder of an orthorhombic Na-containing niobium titanium composite oxide of $Li_2Na_{1.5}Sr_{0.2}Ti_{5.9}Nb_{0.1}O_{14}$ was used as the first composite oxide in place of the powder of $Li_2Na_{1.7}Ti_{5.7}Nb_{0.3}O_{14}$.

The powder of the first composite oxide used in Example 5 was prepared in the same procedure as the first composite oxide of Example 1 except for the following points. First, a powder of strontium nitrate ($Sr(NO_3)_2$) was further used as a starting material. Titanium oxide, strontium nitrate, lithium carbonate, sodium carbonate, and niobium (V) hydroxide as starting materials were mixed so that the molar ratio of Li:Na:Sr:Ti:Nb in the mixture was 2:1.5:0.2:5.9:0.1.

In Example 5, the first composite oxide and the second composite oxide were mixed at a mass ratio of 72% by mass:18% by mass.

Example 6

In Example 6, a nonaqueous electrolyte battery of Example 6 was produced in the same manner as in Example 1 except that a powder of an orthorhombic Na-containing niobium titanium composite oxide of $Li_2Na_{1.5}Ba_{0.2}Ti_{5.9}Nb_{0.1}O_{14}$ was used as the first composite oxide in place of the powder of $Li_2Na_{1.7}Ti_{5.7}Nb_{0.3}O_{14}$.

The powder of the first composite oxide used in Example 6 was prepared in the same procedure as the first composite oxide of Example 1 except for the following points. First, a powder of barium carbonate ($BaCO_3$) was further used as a starting material. Titanium oxide, barium carbonate, lithium carbonate, sodium carbonate, and niobium (V) hydroxide as starting materials were mixed so that the molar ratio of Li:Na:Ba:Ti:Nb in the mixture was 2:1.5:0.2:5.9:0.1.

In Example 6, the first composite oxide and the second composite oxide were mixed at a mass ratio of 72% by mass:18% by mass.

Example 7

In Example 7, a nonaqueous electrolyte battery of Example 7 was produced in the same manner as in Example 1 except that a powder of an orthorhombic Na-containing niobium titanium composite oxide of $Li_2Na_{1.5}Ba_{0.2}Ti_{5.5}Nb_{0.5}O_{14}$ powder was used as the first composite oxide in place of the powder of $Li_2Na_{1.7}Ti_{5.7}Nb_{0.3}O_{14}$.

The powder of the first composite oxide used in Example 7 was prepared in the same procedure as the first composite oxide of Example 6 except that titanium oxide, barium carbonate, lithium carbonate, sodium carbonate, and niobium (V) hydroxide as starting materials were mixed so that the molar ratio of Li:Na:Ba:Ti:Nb in the mixture was 2:1.5:0.2:5.5:0.5.

In Example 7, the first composite oxide and the second composite oxide were mixed at a mass ratio of 72% by mass:18% by mass.

Example 8

In Example 8, a nonaqueous electrolyte battery of Example 8 was produced in the same manner as in Example 1 except that a powder of an orthorhombic Na-containing niobium titanium composite oxide of $Li_{2.3}Na_{1.9}Ti_{5.8}Nb_{0.1}Al_{0.3}O_{14}$ was used as the first composite oxide in place of the powder of $Li_2Na_{1.7}Ti_{5.7}Nb_{0.3}O_{14}$.

The powder of the first composite oxide used in Example 8 was prepared in the same procedure as the first composite oxide of Example 1 except for the following points. First, a powder of aluminum oxide ($Al_2O_3$) was further used as a starting material. Titanium oxide, aluminum oxide, lithium carbonate, sodium carbonate, and niobium (V) hydroxide as starting materials were mixed so that the molar ratio of Li:Na:Ti:Nb:Al in the mixture was 2.3:1.9:5.8:0.1:0.3.

In Example 8, the first composite oxide and the second composite oxide were mixed at a mass ratio of 72% by mass:18% by mass.

Example 9

In Example 9, a nonaqueous electrolyte battery of Example 9 was produced in the same manner as in Example 1 except that a powder of an orthorhombic Na-containing niobium titanium composite oxide of $Li_2Na_{1.9}Ti_{5.8}Nb_{0.1}Zr_{0.1}O_{14}$ was used as the first composite oxide in place of the powder of $Li_2Na_{1.7}Ti_{5.7}Nb_{0.3}O_{14}$.

The powder of the first composite oxide used in Example 9 was prepared in the same procedure as the first composite oxide of Example 1 except for the following points. First, a powder of zirconium oxide ($ZrO_2$) was further used as a starting material. Titanium oxide, zirconium oxide, lithium carbonate, sodium carbonate, and niobium (V) hydroxide were mixed so that the molar ratio of Li:Na:Ti:Nb:Zr was 2:1.9:5.8:0.1:0.1.

In Example 9, the first composite oxide and the second composite oxide were mixed at a mass ratio of 72% by mass:18% by mass.

Example 10

In Example 10, a nonaqueous electrolyte battery of Example 10 was produced in the same manner as in Example 1 except that a powder of an orthorhombic Na-containing niobium titanium composite oxide of $Li_2Na_{1.9}Ti_{5.8}Nb_{0.1}Sn_{0.1}O_{14}$ was used as the first composite oxide in place of the powder of $Li_2Na_{1.7}Nb_{0.3}O_{14}$.

The powder of the first composite oxide used in Example 10 was prepared in the same procedure as the first composite oxide of Example 1 except for the following points. First, a powder of tin oxide ($SnO_2$) was further used as a starting material. Titanium oxide, tin oxide, lithium carbonate, sodium carbonate, and niobium (V) hydroxide as starting materials were mixed so that the molar ratio of Li:Na:Ti:Nb:Sn in the mixture was 2:1.9:5.8:0.1:0.1.

In Example 10, the first composite oxide and the second composite oxide were mixed at a mass ratio of 72% by mass:18% by mass.

Example 11

In Example 11, a nonaqueous electrolyte battery of Example 11 was produced in the same manner as in Example 1 except that a powder of an orthorhombic Na-containing niobium titanium composite oxide of $Li_{2.1}Na_{1.9}Ti_{5.8}Nb_{0.1}Ta_{0.1}O_{14}$ was used as the first composite oxide in place of the powder of $Li_2Na_{1.7}Ti_{5.7}Nb_{0.3}O_{14}$.

The powder of the first composite oxide used in Example 11 was prepared in the same procedure as the first composite oxide of Example 1 except for the following points. First, a powder of tantalum pentoxide ($Ta_2O_5$) powder was further used as a starting material. Titanium oxide, tantalum pentoxide, lithium carbonate, sodium carbonate, and niobium (V) hydroxide as starting materials were mixed so that the molar ratio of Li:Na:Ti:Nb:Ta in the mixture was 2.1:1.9:5.8:0.1:0.1.

In Example 11, the first composite oxide and the second composite oxide were mixed at a mass ratio of 72% by mass:18% by mass.

Example 12

In Example 12, a nonaqueous electrolyte battery of Example 12 was produced in the same manner as in Example 1 except that a powder of an orthorhombic Na-containing niobium titanium composite oxide of $Li_{2.1}Na_{1.9}Ti_{5.8}Nb_{0.1}V_{0.1}O_{14}$ was used as the first composite oxide in place of the powder of $Li_2Na_{1.7}Ti_{5.7}Nb_{0.3}O_{14}$.

The powder of the first composite oxide used in Example 12 was prepared in the same procedure as the first composite oxide of Example 1 except for the following points. First, a powder of vanadium (V) oxide ($V_2O_5$) was further used as a starting material. Titanium oxide, vanadium (V)oxide, lithium carbonate, sodium carbonate, and niobium (V) hydroxide as starting materials were mixed so that the molar ratio of Li:Na:Ti:Nb:V in the mixture was 2.1:1.9:5.8:0.1:0.1.

In Example 12, the first composite oxide and the second composite oxide were mixed at a mass ratio of 72% by mass:18% by mass.

Example 13

In Example 13, a nonaqueous electrolyte battery of Example 13 was produced in the same manner as in Example 1 except that a powder of an orthorhombic Na-containing niobium titanium composite oxide of $Li_2Na_{1.9}Ti_{5.8}Nb_{0.1}Fe_{0.1}O_{14}$ was used as the first composite oxide in place of the powder of $Li_2Na_{1.7}Ti_{5.7}Nb_{0.3}O_{14}$.

The powder of the first composite oxide used in Example 13 was prepared in the same procedure as the first composite oxide of Example 1 except for the following points. First, a powder of iron (III) oxide ($Fe_2O_3$) was further used as a starting material. Titanium oxide, iron (III) oxide, lithium carbonate, sodium carbonate, and niobium (V) hydroxide as starting materials were mixed so that the molar ratio of Li:Na:Ti:Nb:Fe in the mixture was 2:1.9:5.8:0.1:0.1.

In Example 13, the first composite oxide and the second composite oxide were mixed at a mass ratio of 72% by mass:18% by mass.

Example 14

In Example 14, a nonaqueous electrolyte battery of Example 14 was produced in the same manner as in Example 1 except that a powder of an orthorhombic Na-containing niobium titanium composite oxide of $Li_2Na_{1.9}Ti_{5.8}Nb_{0.1}Co_{0.1}O_{14}$ was used as the first composite oxide in place of the powder of $Li_2Na_{1.7}Ti_{5.7}Nb_{0.3}O_{14}$.

The powder of the first composite oxide used in Example 14 was prepared in the same procedure as the first composite oxide of Example 1 except for the following points. First, a powder of cobalt oxide ($Co_3O_4$) was further used as a starting material. Titanium oxide, cobalt oxide, lithium carbonate, sodium carbonate, and niobium (V) hydroxide as starting materials were mixed so that the molar ratio of Li:Na:Ti:Nb:Co in the mixture was 2:1.9:5.8:0.1:0.1.

In Example 14, the first composite oxide and the second composite oxide were mixed at a mass ratio of 72% by mass:18% by mass.

Example 15

In Example 15, a nonaqueous electrolyte battery of Example 15 was produced in the same manner as in Example 1 except that a powder of an orthorhombic Na-containing niobium titanium composite oxide of $Li_2Na_{1.9}Ti_{5.8}Nb_{0.1}Mn_{0.1}O_{14}$ was used as the first composite oxide in place of the powder of $Li_2Na_{1.7}Ti_{5.7}Nb_{0.3}O_{14}$.

The powder of the first composite oxide used in Example 15 was prepared in the same procedure as the first composite oxide of Example 1 except for the following points. First, a powder of manganese oxide ($Mn_3O_4$) was further used as a starting material. Titanium oxide, manganese oxide, lithium carbonate, sodium carbonate, and niobium (V) hydroxide as starting materials were mixed so that the molar ratio of Li:Na:Ti:Nb:Mn in the mixture was 2:1.9:5.8:0.1:0.1.

In Example 15, the first composite oxide and the second composite oxide were mixed at a mass ratio of 72% by mass:18% by mass.

Example 16

In Example 16, a nonaqueous electrolyte battery of Example 16 was produced in the same manner as in Example 1 except that a powder of an orthorhombic Na-containing niobium titanium composite oxide of $Li_2Na_{1.9}Ti_{5.8}Nb_{0.1}Mo_{0.1}O_{14}$ was used as the first composite oxide in place of the powder of $Li_2Na_{1.7}Ti_{5.7}Nb_{0.3}O_{14}$.

The powder of the first composite oxide used in Example 16 was prepared in the same procedure as the first composite oxide of Example 1 except for the following points. First, a powder of molybdenum oxide ($MoO_3$) was further used as a starting material. Titanium oxide, molybdenum oxide, lithium carbonate, sodium carbonate, and niobium (V) hydroxide as starting materials were mixed so that the molar ratio of Li:Na:Ti:Nb:Mo in the mixture was 2:1.9:5.8:0.1:0.1.

In Example 16, the first composite oxide and the second composite oxide were mixed at a mass ratio of 72% by mass:18% by mass.

Should be noted that the first composite oxide prepared in each of Examples 2 to 16 was obtained by subjecting the mixture of starting materials to a heat treatment at 900° C. for 3 hours in the same manner as in Example 1.

The crystalline structure and composition of the first composite oxide prepared in each of Examples 2 to 16 were analyzed using ICP and X-ray diffraction before being used for battery production. As a result, it is found that the first composite oxide prepared in each of Examples 2 to 16 is a composite oxide having the target crystalline structure and composition.

Example 17

In Example 17, a nonaqueous electrolyte battery of Example 1 was produced in the same manner as in Example 1 except that a powder of composite oxide of $Li_{2.2}Na_{1.8}Ti_6O_{14}$ was used as the second composite oxide in place of the powder of $Li_2Na_2Ti_6O_{14}$.

The powder of the second composite oxide used in Example 17 was prepared in the same procedure as the second composite oxide of Example 1 except that titanium oxide, lithium carbonate, and sodium carbonate as starting materials were mixed so that the molar ratio of Li:Na:Ti in the mixture was 2.2:1.8:6.

In Example 17, the first composite oxide and the second composite oxide were mixed at a mass ratio of 72% by mass:18% by mass.

Example 18

In Example 18, a nonaqueous electrolyte battery of Example 18 was produced in the same manner as in Example 1 except that a powder of composite oxide of $Li_{1.8}Na_{2.2}Ti_6O_{14}$ was used as the second composite oxide in place of the powder of $Li_2Na_2Ti_6O_{14}$.

The powder of the second composite oxide used in Example 18 was prepared in the same procedure as the second composite oxide of Example 1 except that titanium oxide, lithium carbonate, and sodium carbonate as starting materials were mixed so that the molar ratio of Li:Na:Ti in the mixture was 1.8:2.2:6.

In Example 18, the first composite oxide and the second composite oxide were mixed at a mass ratio of 72% by mass:18% by mass.

Should be noted that the second composite oxide prepared in each of Examples 17 and 18 was obtained by subjecting a mixture of starting materials to a heat treatment at 800° C. for 3 hours in the same manner as in Example 1.

The crystalline structure and composition of the second composite oxide prepared in each of Examples 17 and 18 were analyzed using ICP before being used for battery production. As a result, it is found that the second composite oxide prepared in each of Examples 17 and 18 is a composite oxide having the target composition.

Example 19

In Example 19, a nonaqueous electrolyte battery of Example 19 was produced in the same procedure as in Example 1 except that a mixture of starting materials was subjected to a heat treatment at 850° C. for 3 hours during preparation of the first composite oxide.

The powder of the first composite oxide prepared in Example 19 was analyzed in the same manner as in Example 1. As a result, it is found that the powder comprised the primary particles having an average primary particle size of 1 μm.

The composition of the first composite oxide prepared in Example 19 was analyzed using ICP before being used for battery production. As a result, it is found that the first composite oxide prepared in Example 19 is an orthorhombic Na-containing niobium titanium composite oxide of $Li_2Na_{1.7}Ti_{5.7}Nb_{0.3}O_{14}$.

Example 20

In Example 20, a nonaqueous electrolyte battery of Example 20 was produced in the same procedure as in Example 1 except that a mixture of starting materials was subjected to a heat treatment at 850° C. for 1 hour during preparation of the first composite oxide.

The powder of the first composite oxide powder prepared in Example 20 was analyzed in the same manner as in Example 1. As a result, it is found that the powder comprised the primary particles having an average primary particle size of 0.7 μm.

The composition of the first composite oxide prepared in Example 20 was analyzed using ICP before being used for battery production. As a result, it is found that the first composite oxide prepared in Example 19 is an orthorhombic Na-containing niobium titanium composite oxide of $Li_2Na_{1.7}Ti_{5.7}Nb_{0.3}O_{14}$.

Example 21

In Example 21, a nonaqueous electrolyte battery of Example 21 was produced in the same procedure as in Example 19 except that a mixture of starting materials was subjected to a heat treatment at 850° C. for 6 hours during preparation of the second composite oxide.

The powder of the second composite oxide powder prepared in Example 21 was analyzed in the same manner as in Example 1. As a result, it is found that the powder comprised the primary particles having an average primary particle size of 3 μm.

The crystalline structure and composition of the second composite oxide prepared in Example 21 were analyzed using ICP and X-ray diffraction before being used for battery production. As a result, it is found that the first composite oxide prepared in Example 19 is an orthorhombic composite oxide of $Li_2Na_2Ti_6O_{14}$.

Example 22

In Example 22, a nonaqueous electrolyte battery of Example 1 was produced in the same manner as in Example 22 except that the first composite oxide and the second composite oxide were mixed at a mass ratio of 45% by mass:45% by mass during production of the negative electrode.

Examples 23 to 32

In Examples 23 to 32, nonaqueous electrolyte batteries of Examples 23 to 32 were produced in the same procedure as in Example 1 except that the positive electrode active materials shown below were used as the positive electrode active material in place of lithium nickel cobalt manganese composite oxide of $LiNi_{0.33}Co_{0.33}Mn_{0.33}O_2$.

In Example 23, a powder of lithium cobalt composite oxide ($LiCoO_2$) was used as a positive electrode active material. In Example 24, a powder of lithium nickel cobalt manganese composite oxide ($LiNi_{0.5}Co_{0.2}Mn_{0.3}O_2$) was used as a positive electrode active material. In Example 25, a powder of lithium nickel cobalt manganese composite oxide ($LiNi_{0.6}Co_{0.2}Mn_{0.2}O_2$) was used as a positive electrode active material. In Example 26, a powder of lithium nickel cobalt manganese composite oxide ($LiNi_{0.8}Co_{0.1}Mn_{0.1}O_2$) was used as a positive electrode active material. In Example 27, a lithium aluminum manganese composite oxide ($LiAl_{0.15}Mn_{1.85}O_4$) was used as a positive electrode active material. In Example 28, a lithium manganese iron magnesium phosphate compound ($LiMn_{0.85}Fe_{0.1}Mg_{0.05}PO_4$) was used as a positive electrode active material.

In Example 29, a mixed powder of 72% by mass of lithium nickel cobalt manganese composite oxide ($LiNi_{0.33}Co_{0.33}Mn_{0.33}O_2$) and 18% by mass of lithium cobalt composite oxide ($LiCoO_2$) was used as a positive electrode active material. In Example 30, a mixed powder of 45% by mass of lithium nickel cobalt manganese composite oxide ($LiNi_{0.33}Co_{0.33}Mn_{0.33}O_2$) and 45% by mass of lithium cobalt composite oxide ($LiCoO_2$) was used as a positive electrode. In Example 31, a mixed powder of 45% by mass of lithium nickel cobalt manganese composite oxide ($LiNi_{0.33}Co_{0.33}Mn_{0.33}O_2$) and 45% by mass of lithium aluminum manganese composite oxide ($LiAl_{0.15}Mn_{1.85}O_4$) was used as a positive electrode active material. In Example 32, a mixed powder of 45% by mass of lithium nickel cobalt manganese composite oxide ($LiNi_{0.33}Co_{0.33}Mn_{0.33}O_2$) and 45% by mass of lithium manganese iron magnesium phosphate compound ($LiMn_{0.85}Fe_{0.1}Mg_{0.05}PO_4$) was used as a positive electrode active material.

Comparative Example 1

In Comparative Example 1, a nonaqueous electrolyte battery of Comparative Example 1 was produced in the same procedure as in Example 1 except that the first composite oxide of $Li_2Na_{1.7}Ti_{5.7}Nb_{0.3}O_{14}$ was used as the negative electrode active material, but the second composite oxide was not used during production of the negative electrode.

Comparative Example 2

In Comparative Example 2, a nonaqueous electrolyte battery of Comparative example 2 was produced in the same procedure as in Example 1 except that the second composite oxide of $Li_2Na_2Ti_6O_{14}$ was used as the negative electrode active material, but the first composite oxide was not used during production of the negative electrode.

Comparative Example 3

In Comparative Example 3, a nonaqueous electrolyte battery of Comparative example 3 was produced in the same procedure as in Example 1 except for the following points in Comparative example 3.

In Comparative example 3, a lithium titanate of $Li_4Ti_5O_{12}$ having an average primary particle size of 0.7 μm was used in place of the powder of composite oxide of $Li_2Na_2Ti_6O_{14}$.

The mass ratio of the first composite oxide of $Li_2Na_{1.7}Ti_{5.7}Nb_{0.3}O_{14}$ to the lithium titanate in a negative electrode was 45% by mass:45% by mass.

Examples 33 to 35

In Examples 33 to 35, nonaqueous electrolyte batteries of Examples 33 to 35 were produced in the same procedure as in Example 1 except the production conditions of the negative electrode.

Specifically, in Example 33, 72% by mass of the powder of the first composite oxide of $Li_2Na_{1.7}Ti_{5.7}Nb_{0.3}O_{14}$ and 18% by mass of the powder of the second composite oxide of $Li_2Na_2Ti_6O_{14}$ as negative electrode active materials and 5% by mass of acetylene black as a conductive agent were mixed in powder mixing device capable of the high-speed stirring. The mixed powder thus obtained was added to a solution obtained by dissolving 5% by mass of polyvinylidene fluoride (PVdF) as a binder in N-methyl pyrrolidone (NMP) and the resultant mixture was further mixed with a planetary centrifugal mixer to prepare a slurry for a negative electrode.

In Example 34, 72% by mass of the powder of the first composite oxide of $Li_2Na_{1.7}Ti_{5.7}Nb_{0.3}O_{14}$ and 18% by mass of the powder of the second composite oxide of $Li_2Na_2Ti_6O_{14}$ as negative electrode active materials, 5% by mass of acetylene black as a conductive agent, and 5% by mass of polyvinylidene fluoride (PVdF) as a binder were added to N-methyl pyrrolidone (NMP), and mixed. The thus obtained mixture was dispersed using a planetary centrifugal mixer to prepare a slurry. The slurry was further dispersed using a bead mill with zirconia beads to obtain a slurry for a negative electrode.

In Example 35, at first, 72% by mass of the powder of the first composite oxide of $Li_2Na_{1.7}Ti_{5.7}Nb_{0.3}O_{14}$ and 18% by mass of the second composite oxide of $Li_2Na_2Ti_6O_{14}$ as negative electrode active materials, and 5% by mass of acetylene black as a conductive agent were mixed in a powder mixing device capable of the high-speed stirring. The mixed powder thus obtained was added to a solution obtained by dissolving 5% by mass of polyvinylidene fluoride (PVdF) as a binder in N-methyl pyrrolidone (NMP) and the resultant mixture was further mixed with a planetary centrifugal mixer to prepare a slurry. The slurry was further dispersed using a bead mill with zirconia beads to prepare a slurry for a negative electrode.

Tables 1 and 2 below show the composition and average primary particle size of each of the first composite oxide and the second composite oxide and the mass ratio of the first composite oxide and the second composite oxide in the negative electrode regarding Examples 1 to 35 and Comparative examples 1 to 3.

TABLE 1

| | First Composite Oxide | | Second Composite Oxide | | Ratio of Mass of First Composite Oxide to Mass of Second Composite Oxide ($W_A/W_B$) [% by mass/% by mass] |
|---|---|---|---|---|---|
| | Composition | Average Primary Particle Size $D_A$ [μm] | Composition | Average Primary Particle Size $D_B$ [μm] | |
| Example 1 | $Li_2Na_{1.7}Ti_{5.7}Nb_{0.3}O_{14}$ | 3 | $Li_2Na_2Ti_6O_{14}$ | 0.7 | 72/18 |
| Example 2 | $Li_2Na_{1.9}Ti_{5.9}Nb_{0.1}O_{14}$ | 3 | $Li_2Na_2Ti_6O_{14}$ | 0.7 | 72/18 |
| Example 3 | $Li_2Na_{1.5}Ti_{5.5}Nb_{0.5}O_{14}$ | 3 | $Li_2Na_2Ti_6O_{14}$ | 0.7 | 72/18 |
| Example 4 | $Li_2NaTi_5NbO_{14}$ | 3 | $Li_2Na_2Ti_6O_{14}$ | 0.7 | 72/18 |
| Example 5 | $Li_2Na_{1.5}Sr_{0.2}Ti_{5.9}Nb_{0.1}O_{14}$ | 3 | $Li_2Na_2Ti_6O_{14}$ | 0.7 | 72/18 |
| Example 6 | $Li_2Na_{1.5}Ba_{0.2}Ti_{5.9}Nb_{0.1}O_{14}$ | 3 | $Li_2Na_2Ti_6O_{14}$ | 0.7 | 72/18 |
| Example 7 | $Li_2Na_{1.5}Ba_{0.2}Ti_{5.5}Nb_{0.5}O_{14}$ | 3 | $Li_2Na_2Ti_6O_{14}$ | 0.7 | 72/18 |
| Example 8 | $Li_{2.3}Na_{1.9}Ti_{5.8}Nb_{0.1}Al_{0.3}O_{14}$ | 3 | $Li_2Na_2Ti_6O_{14}$ | 0.7 | 72/18 |
| Example 9 | $Li_2Na_{1.9}Ti_{5.8}Nb_{0.1}Zr_{0.1}O_{14}$ | 3 | $Li_2Na_2Ti_6O_{14}$ | 0.7 | 72/18 |
| Example 10 | $Li_2Na_{1.9}Ti_{5.8}Nb_{0.1}Sn_{0.1}O_{14}$ | 3 | $Li_2Na_2Ti_6O_{14}$ | 0.7 | 72/18 |
| Example 11 | $Li_{2.1}Na_{1.9}Ti_{5.8}Nb_{0.1}Ta_{0.1}O_{14}$ | 3 | $Li_2Na_2Ti_6O_{14}$ | 0.7 | 72/18 |
| Example 12 | $Li_{2.1}Na_{1.9}Ti_{5.8}Nb_{0.1}V_{0.1}O_{14}$ | 3 | $Li_2Na_2Ti_6O_{14}$ | 0.7 | 72/18 |
| Example 13 | $Li_2Na_{1.9}Ti_{5.8}Nb_{0.1}Fe_{0.1}O_{14}$ | 3 | $Li_2Na_2Ti_6O_{14}$ | 0.7 | 72/18 |
| Example 14 | $Li_2Na_{1.9}Ti_{5.8}Nb_{0.1}Co_{0.1}O_{14}$ | 3 | $Li_2Na_2Ti_6O_{14}$ | 0.7 | 72/18 |
| Example 15 | $Li_2Na_{1.9}Ti_{5.8}Nb_{0.1}Mn_{0.1}O_{14}$ | 3 | $Li_2Na_2Ti_6O_{14}$ | 0.7 | 72/18 |
| Example 16 | $Li_2Na_{1.9}Ti_{5.8}Nb_{0.1}Mo_{0.1}O_{14}$ | 3 | $Li_2Na_2Ti_6O_{14}$ | 0.7 | 72/18 |
| Example 17 | $Li_2Na_{1.7}Ti_{5.7}Nb_{0.3}O_{14}$ | 3 | $Li_{2.2}Na_{1.8}Ti_6O_{14}$ | 0.7 | 72/18 |
| Example 18 | $Li_2Na_{1.7}Ti_{5.7}Nb_{0.3}O_{14}$ | 3 | $Li_{1.8}Na_{2.2}Ti_6O_{14}$ | 0.7 | 72/18 |

TABLE 2

| | First Composite Oxide | | Second Composite Oxide | | Ratio of Mass of First Composite Oxide to Mass of Second Composite Oxide ($W_A/W_B$) [% by mass/% by mass] |
|---|---|---|---|---|---|
| | Composition | Average Primary Particle Size $D_A$ [μm] | Composition | Average Primary Particle Size $D_B$ [μm] | |
| Example 19 | $Li_2Na_{1.7}Ti_{5.7}Nb_{0.3}O_{14}$ | 1 | $Li_2Na_2Ti_6O_{14}$ | 0.7 | 72/18 |
| Example 20 | $Li_2Na_{1.7}Ti_{5.7}Nb_{0.3}O_{14}$ | 0.7 | $Li_2Na_2Ti_6O_{14}$ | 0.7 | 72/18 |
| Example 21 | $Li_2Na_{1.7}Ti_{5.7}Nb_{0.3}O_{14}$ | 1 | $Li_2Na_2Ti_6O_{14}$ | 3 | 72/18 |
| Example 22 | $Li_2Na_{1.7}Ti_{5.7}Nb_{0.3}O_{14}$ | 3 | $Li_2Na_2Ti_6O_{14}$ | 0.7 | 45/45 |
| Example 23 | $Li_2Na_{1.7}Ti_{5.7}Nb_{0.3}O_{14}$ | 3 | $Li_2Na_2Ti_6O_{14}$ | 0.7 | 72/18 |
| Example 24 | $Li_2Na_{1.7}Ti_{5.7}Nb_{0.3}O_{14}$ | 3 | $Li_2Na_2Ti_6O_{14}$ | 0.7 | 72/18 |
| Example 25 | $Li_2Na_{1.7}Ti_{5.7}Nb_{0.3}O_{14}$ | 3 | $Li_2Na_2Ti_6O_{14}$ | 0.7 | 72/18 |
| Example 26 | $Li_2Na_{1.7}Ti_{5.7}Nb_{0.3}O_{14}$ | 3 | $Li_2Na_2Ti_6O_{14}$ | 0.7 | 72/18 |
| Example 27 | $Li_2Na_{1.7}Ti_{5.7}Nb_{0.3}O_{14}$ | 3 | $Li_2Na_2Ti_6O_{14}$ | 0.7 | 72/18 |
| Example 28 | $Li_2Na_{1.7}Ti_{5.7}Nb_{0.3}O_{14}$ | 3 | $Li_2Na_2Ti_6O_{14}$ | 0.7 | 72/18 |
| Example 29 | $Li_2Na_{1.7}Ti_{5.7}Nb_{0.3}O_{14}$ | 3 | $Li_2Na_2Ti_6O_{14}$ | 0.7 | 72/18 |
| Example 30 | $Li_2Na_{1.7}Ti_{5.7}Nb_{0.3}O_{14}$ | 3 | $Li_2Na_2Ti_6O_{14}$ | 0.7 | 72/18 |
| Example 31 | $Li_2Na_{1.7}Ti_{5.7}Nb_{0.3}O_{14}$ | 3 | $Li_2Na_2Ti_6O_{14}$ | 0.7 | 72/18 |
| Example 32 | $Li_2Na_{1.7}Ti_{5.7}Nb_{0.3}O_{14}$ | 3 | $Li_2Na_2Ti_6O_{14}$ | 0.7 | 72/18 |
| Comparative Example 1 | $Li_2Na_{1.7}Ti_{5.7}Nb_{0.3}O_{14}$ | 3 | — | — | 72/0 |
| Comparative Example 2 | — | — | $Li_2Na_2Ti_6O_{14}$ | 0.7 | 0/18 |
| Comparative Example 3 | $Li_2Na_{1.7}Ti_{5.7}Nb_{0.3}O_{14}$ | 3 | $Li_4Ti_5O_{12}$ | 0.7 | 45/45 |
| Example 33 | $Li_2Na_{1.7}Ti_{5.7}Nb_{0.3}O_{14}$ | 3 | $Li_2Na_2Ti_6O_{14}$ | 0.7 | 72/18 |
| Example 34 | $Li_2Na_{1.7}Ti_{5.7}Nb_{0.3}O_{14}$ | 3 | $Li_2Na_2Ti_6O_{14}$ | 0.7 | 72/18 |
| Example 35 | $Li_2Na_{1.7}Ti_{5.7}Nb_{0.3}O_{14}$ | 3 | $Li_2Na_2Ti_6O_{14}$ | 0.7 | 72/18 |

[Test]

The nonaqueous electrolyte batteries thus produced were subjected to performance tests in the following procedure.

First, the state-of-charge (SOC) of each of the nonaqueous electrolyte batteries was adjusted to SOC 80%.

Next, each of the nonaqueous electrolyte batteries in a state-of-charge of SOC 80% was charged at a constant current of 10 C in an environment of 25° C. for 10 seconds.

Tables 3 and 4 below show the input density per mass [kW/kg] of each of the nonaqueous electrolyte batteries in the charge process and the charge-and-discharge range [V] regarding each of the nonaqueous electrolyte batteries.

TABLE 3

| | Input Density at 25° C. and in 80% SOC [kW/kg] | Range of Charge and Discharge |
|---|---|---|
| Example 1 | 2.4 | 1.8-3.1 V |
| Example 2 | 2.2 | 1.8-3.1 V |
| Example 3 | 2.5 | 1.8-3.1 V |
| Example 4 | 2.4 | 1.8-3.1 V |
| Example 5 | 2.7 | 1.8-3.1 V |
| Example 6 | 2.6 | 1.8-3.1 V |
| Example 7 | 2.7 | 1.8-3.1 V |
| Example 8 | 2.5 | 1.8-3.1 V |
| Example 9 | 2.4 | 1.8-3.1 V |
| Example 10 | 2.5 | 1.8-3.1 V |
| Example 11 | 2.3 | 1.8-3.1 V |
| Example 12 | 2.4 | 1.8-3.1 V |
| Example 13 | 2.2 | 1.8-3.1 V |
| Example 14 | 2.4 | 1.8-3.1 V |
| Example 15 | 2.4 | 1.8-3.1 V |
| Example 16 | 2.3 | 1.8-3.1 V |
| Example 17 | 2.5 | 1.8-3.1 V |
| Example 18 | 2.1 | 1.8-3.1 V |

TABLE 4

| | Input Density at 25° C. and in 80% SOC [kW/kg] | Range of Charge and Discharge |
|---|---|---|
| Example 19 | 2.5 | 1.8-3.1 V |
| Example 20 | 2.6 | 1.8-3.1 V |
| Example 21 | 2.2 | 1.8-3.1 V |
| Example 22 | 2.8 | 1.8-3.1 V |
| Example 23 | 2.7 | 1.8-3.1 V |
| Example 24 | 2.3 | 1.8-3.1 V |
| Example 25 | 2.3 | 1.8-3.1 V |
| Example 26 | 2.2 | 1.8-3.1 V |
| Example 27 | 2.9 | 1.8-3.1 V |
| Example 28 | 2.1 | 1.8-3.1 V |
| Example 29 | 2.5 | 1.8-3.1 V |
| Example 30 | 2.6 | 1.8-3.1 V |
| Example 31 | 2.7 | 1.8-3.1 V |
| Example 32 | 2.2 | 1.8-3.1 V |
| Comparative Example 1 | 1.8 | 1.8-3.1 V |
| Comparative Example 2 | 1.9 | 1.8-3.1 V |
| Comparative Example 3 | 1.8 | 1.8-3.1 V |
| Example 33 | 2.5 | 1.8-3.1 V |
| Example 34 | 2.6 | 1.8-3.1 V |
| Example 35 | 2.7 | 1.8-3.1 V |

The results in Tables 3 and 4 show that each of the nonaqueous electrolyte batteries of Examples 1 to 35 exhibited an excellent input performance in a high state-of-charge, compared to the nonaqueous electrolyte batteries of Comparative Examples 1 to 3.

As shown in Table 1, Examples 1 to 16 are examples in which different elemental compositions of the first composite oxide, each of which is the orthorhombic Na-containing niobium titanium composite oxide, were used. Table 3 shows that the charge-and-discharge voltage ranges of the nonaqueous electrolyte batteries of Examples 1 to 16 are equivalent. This is assumed to be due to the fact that even if the elemental composition was different, the operating potential of the orthorhombic Na-containing niobium titanium composite oxide was equivalent in each case.

Comparison of the results of Examples 1 to 4 reveals that the content of Nb is preferably 0.3 mol or more per 1 mol of the first composite oxide.

Comparison of Example 1 to Examples 5 to 7 reveals that the input performance is further improved by additionally including Sr or Ba.

The results of Examples 8 to 16 indicate that the use of the first composite oxide containing at least one selected from the group consisting of Al, Zr, Sn, Ta, V, Fe, Co, Mn, and Mo allows for production of a nonaqueous electrolyte battery exhibiting an excellent input performance.

Examples 17 and 18 are examples in which the composition of the second composite oxide represented by the general formula of $Li_{2+a}Na_{2+b}Ti_6O_{14}$ ($-0.2 \leq a \leq 2$, $-0.2 \leq b \leq 0.2$) was changed from that in Example 1. Comparison of the results of these examples shows that a larger amount of Li in the second composite oxide tended to result in an excellent input performance.

Examples 19 and 21 are examples in which the average primary particle size $D_A$ of the first composite oxide and/or the average primary particle size $D_B$ of the second composite oxide were changed from those in Example 1. Comparison of these examples shows that the smaller average primary particle size $D_A$ of the first composite oxide of the orthorhombic Na-containing niobium titanium composite oxide results in an excellent input performance. Further, it is found that a larger average primary particle size $D_B$ of the second composite oxide represented by the general formula of $Li_{2+a}Na_{2+b}Ti_6O_{14}$ ($-0.2 \leq a \leq 2$, $-0.2 \leq b \leq 0.2$) tended to result in a decrease in an input performance.

Example 22 is an example in which the ratio of the mass $W_A$ of the first composite oxide to the mass $W_B$ of the second composite oxide was changed from that in Example 1. Comparison of the results of Example 1 and Example 22 shows that the input performance are largely improved by increasing the ratio of the second composite oxide represented by the general formula of $Li_{2+a}Na_{2+b}Ti_6O_{14}$ ($-0.2 \leq a \leq 2$, $-0.2 \leq b \leq 0.2$) in the negative electrode. This shows that the second composite oxide greatly contributes to improvement of the input performance.

Examples 23 to 32 are examples in which the positive electrode active material was changed from that in Example 1. Hence, comparison of these examples reveals the difference in an input performance depending on differences in the positive electrode active material to be used.

Specifically, in Examples 23 to 28, $LiCoO_2$, $LiNi_{0.5}Co_{0.2}Mn_{0.3}O_2$, $LiNi_{0.6}CO_{0.2}Mn_{0.2}O_2$, $LiNi_{0.8}CO_{0.1}Mn_{0.1}O_2$, $LiNi_{0.15}Mn_{1.85}O_4$, and $LiMn_{0.85}Fe_{0.1}Mg_{0.05}PO_4$, respectively, were used as the positive electrode active materials in place of $LiNi_{0.33}CO_{0.33}Mn_{0.33}O_2$. In Examples 29 to 32, the positive electrode including a plurality of the above materials was used. Comparison of $LiCoO_2$, $LiNi_{0.5}CO_{0.2}Mn_{0.3}O_2$, $LiNi_{0.6}Co0._2Mn_{0.2}O_2$, and $LiNi_{0.8}Co_{0.1}Mn_{0.1}O_2$ reveals that Example 23 produced by using $LiCoO_2$ exhibited the highest input performance and the rest of the examples exhibited high input performance when the amount of Ni is smaller. The average voltages of the nonaqueous electrolyte batteries of Example 23, Example 1, and Examples 24 to 26 are 2.55 V, 2.4 V, 2.4 V, 2.4 V, and 2.35 V, respectively. The nonaqueous electrolyte battery of Example 23 produced by using $LiCoO_2$ has the highest battery voltage. The nonaqueous electrolyte battery produced by using the positive electrode active material having a larger amount of Ni tended to have a low battery voltage. These results indicate that the positive electrode active material allows the battery voltage to be adjusted.

The nonaqueous electrolyte battery of Example 27 obtained by using $LiAl_{0.15}Mn_{1.85}O_4$ exhibited a high input performance. On the other hand, the nonaqueous electrolyte battery of Example 28 obtained by using $LiMn_{0.85}Fe_{0.1}Mg_{0.05}PO_4$ exhibited a input performance slightly inferior, compared to those of the examples produced by using $LiAl_{0.1}Mn_{1.85}O_4$, $LiCoO_2$, $LiNi_{0.5}Co_{0.2}Mn_{0.3}O_2$, $LiNi_{0.6}Co_{0.2}Mn_{0.2}O_2$ and $LiNi_{0.8}Co_{0.1}Mn_{0.1}O_2$.

The second composite oxide was not contained in the negative electrode of each of the nonaqueous electrolyte batteries of Comparative examples 1 and 3. Accordingly, as is apparent from Tables 3 and 4, when compared to the nonaqueous electrolyte battery of Example 1 in which the negative electrode included the first and second composite oxides, each of the nonaqueous electrolyte batteries of Comparative examples 1 and 3 exhibited a low input performance in a high SOC.

The first composite oxide was not included in the negative electrode of the nonaqueous electrolyte battery of Comparative example 2. As is apparent from Tables 3 and 4, when compared to the nonaqueous electrolyte battery of Example 1 in which the negative electrode included the first and second composite oxides, the nonaqueous electrolyte battery of Comparative example 2 exhibited a low input performance in a high SOC. This is assumed to be due to the following reasons. In the composite oxide of $Li_2Na_2Ti_6O_{14}$, the reversible capacity per mass of the active material was smaller than that of the orthorhombic Na-containing niobium titanium composite oxide of $Li_2Na_{1.7}Ti_{5.7}Nb_{0.3}O_{14}$, and thus it was necessary to increase the amount of coating of the electrode in Comparative example 2. This resulted in an increase in thickness of the electrode. In Comparative example 2, the amount of coating of the electrode was increased, whereby the mass of the battery was also increased. Accordingly, the nonaqueous electrolyte battery of Comparative example 2 did not have a high input density in a high SOC.

Examples 33 to 35 are examples in which the method for producing the negative electrode was changed from that in Example 1. The nonaqueous electrolyte batteries of Examples 33 to 35 were excellent in an input performance in a high state-of-charge, compared to the nonaqueous electrolyte battery of Example 1. This is assumed to be due to the fact that the first composite oxide of the orthorhombic Na-containing niobium titanium composite oxide, the second composite oxide represented by the general formula of $Li_{2+a}Na_{2+b}Ti_6O_{14}$ ($-0.2 \leq a \leq 2$, $-0.2 \leq b \leq 0.2$), and the conductive agent could be uniformly mixed by mixing the materials in the form of powders with the powder mixing device capable of the high-speed stirring or performing the bead milling the materials in the form of a slurry, resulting in the improvement of the input performance of each of the batteries.

Examples 36 to 38

In Examples 36 to 38, nonaqueous electrolyte batteries of Examples 36 to 38 were produced in the same procedure as in Example 1 except that the use range of the positive electrode was narrowed by increasing the amount of the positive electrode active material with respect to the amount of the negative electrode active material included in the nonaqueous electrolyte battery so as to include an excessive amount of the positive electrode active material.

These nonaqueous electrolyte batteries were subjected to a performance test in the same manner as in Example 1. The results are shown in Table 5 below.

TABLE 5

|  | Input Density at 25° C. and in 80% SOC [kW/kg] | Range of Charge and Discharge |
|---|---|---|
| Example 36 | 2.4 | 1.8-3.0 V |
| Example 37 | 2.2 | 1.8-2.9 V |
| Example 38 | 2.2 | 1.8-2.8 V |

As is apparent from Table 5, the charge voltages of the nonaqueous electrolyte batteries of Examples 36 to 38 were 2.8 V, 2.9 V, and 3.0 V, respectively. On the other hand, as shown in Table 4, the nonaqueous electrolyte batteries of Examples 36 to 38 were excellent in an input performance in a high state-of-charge, compared to Comparative examples 1 to 3. This result indicates that the narrowing of the use range of the positive electrode enables the battery voltage to be changed, and even if the battery voltage is lowered, the use of the negative electrode including the first composite oxide of the orthorhombic Na-containing niobium titanium composite oxide and the second composite oxide represented by the general formula of $Li_{2+a}Na_{2+b}Ti_6O_{14}$ ($-0.2 \leq a \leq 2$, $-0.2 \leq b \leq 0.2$) results in an excellent input performance in a high state-of-charge.

According to one or more of the above embodiments and Examples, there is provided an electrode. The electrode includes an orthorhombic Na-containing niobium titanium composite oxide as a first composite oxide and a second composite oxide represented by the general formula of $Li_{2+a}Na_{2+b}Ti_6O_{14}$ ($-0.2 \leq a \leq 2$, $-0.2 \leq b \leq 0.2$). When the electrode is in a high state-of-charge, lithium can be inserted into and extracted from the second composite oxide. In the second composite oxide, it is possible to reduce changes in potential during input and output in a high state-of-charge. As a result, a nonaqueous electrolyte battery produced by using the electrode can exhibit excellent input-and-output performances in a high state-of-charge.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrode comprising:
    an orthorhombic Na-containing niobium titanium composite oxide as a first composite oxide; and
    a second composite oxide represented by a general formula of $Li_{2+a}Na_{2+b}Ti_6O_{14}$, wherein $-0.2 \leq a \leq 2$ and $-0.2 \leq b \leq 0.2$,
    wherein the orthorhombic Na-containing niobium titanium composite oxide is represented by a general formula of $Li_{2+v}Na_{2-w}M1_xTi_{6-y-z}Nb_yM2_zO_{14+\delta}$, and
    wherein M1 is at least one metallic element selected from the group consisting of Cs, K, Sr, Ba and Ca, M2 is at least one metallic element selected from the group consisting of Zr, Sn, V, Ta, Mo, W, Fe, Co, Mn and Al, $0 \leq v \leq 4$, $0 < w < 2$, $0 \leq x < 2$, $0 < y \leq 6$, $0 \leq z < 3$, and $-0.5 \leq \delta \leq 0.5$.

2. The electrode according to claim 1, wherein, in the general formula of $Li_{2+v}Na_{2-w}M1_xTi_{6-y-z}Nb_yM2_zO_{14+\delta}$, a value of the subscript w is within a range of 0.1 to 1, a value of the subscript x is within a range of 0.05 to 0.2, a value of the subscript y is within a range of 0.1 to 1, a value of the subscript z is within a range of 0.1 to 0.3, a value of the subscript δ is within a range of −0.1 to 0.1.

3. The electrode according to claim 1, wherein, in the general formula of $Li_{2+v}Na_{2-w}M1_xTi_{6-y-z}Nb_yM2_zO_{14+\delta}$, the metallic element M1 comprises at least one of Sr and Ba.

4. The electrode according to claim 1, wherein, in the general formula of $Li_{2+v}Na_{2-w}M1_xTi_{6-y-z}Nb_yM2_zO_{14+\delta}$, the metallic element M2 comprises at least one selected from the group consisting of Al, Zr, SA and V.

5. The electrode according to claim 1, wherein the electrode comprises primary particles of the first composite oxide and primary particles of the second composite oxide, and
    an average particle size of $D_B$ of the primary particles of the second composite oxide is smaller than an average particle size $D_A$ of the primary particles of the first composite oxide.

6. The electrode according to claim 1, wherein, in the electrode, a mass $W_B$ of the second composite oxide is smaller than a mass $W_A$ of the first composite oxide.

7. A nonaqueous electrolyte battery comprising:
    the electrode according to claim 1 as a negative electrode;
    a positive electrode; and
    a nonaqueous electrolyte.

8. The nonaqueous electrolyte battery according to claim 7, wherein the positive electrode comprises at least one selected from the group consisting of a lithium cobalt composite oxide, a lithium nickel cobalt manganese composite oxide, a lithium manganese composite oxide having a spinel structure, and a lithium manganese iron composite phosphate compound having an olivine structure.

9. A battery pack comprising the nonaqueous electrolyte battery according to claim 7.

10. The battery pack according to claim 9, further comprising:
    an external power distribution terminal; and
    a protective circuit.

11. A vehicle comprising the battery pack according to claim 9.

12. The vehicle according to claim 11, wherein the battery pack is configured to recover a regenerative energy caused by a power of the vehicle.

13. A battery pack comprising nonaqueous electrolyte batteries, each of the nonaqueous electrolyte batteries comprising:
    the electrode according to claim 1 as a negative electrode;
    a positive electrode; and
    a nonaqueous electrolyte; and
    wherein the nonaqueous electrolyte batteries are connected in series, in parallel or with a combination of series connection and parallel connection.

* * * * *